United States Patent [19]

Parekh et al.

[11] Patent Number: 5,463,878
[45] Date of Patent: Nov. 7, 1995

[54] CHILLED PRODUCT DISPENSING APPARATUS

[75] Inventors: Shafi Parekh, Irving; Bernard M. Geiger, Dallas; Alexander Tsimberg, Richardson; Zaya H. Malik, Dallas; Reginald H. Fowler, Garland, all of Tex.

[73] Assignee: Froezert USA, Inc., Dallas, Tex.

[21] Appl. No.: 973,800

[22] Filed: Nov. 3, 1992

(Under 37 CFR 1.47)

[51] Int. Cl.[6] ................................................. B67D 5/62
[52] U.S. Cl. ........................... 62/394; 222/146.6; 222/95
[58] Field of Search ..................... 62/393–396; 222/95, 222/105, 146.6, 386.5, 389, 64

[56] References Cited

U.S. PATENT DOCUMENTS

| | | | |
|---|---|---|---|
| 3,044,663 | 7/1962 | Norton et al. | 222/64 X |
| 3,108,449 | 10/1963 | Lents | 62/342 X |
| 3,435,990 | 4/1969 | Pike, Jr. | 62/394 X |
| 4,463,572 | 8/1984 | Brown, Jr. | 62/135 |
| 4,574,984 | 3/1986 | Bonerb | 222/64 X |
| 5,048,724 | 9/1991 | Thomas | 222/105 X |
| 5,123,569 | 6/1992 | Lindner | 222/64 X |
| 5,150,820 | 9/1992 | McGill | 222/146.6 X |
| 5,361,941 | 11/1994 | Parekh et al. | 222/95 |
| 5,365,764 | 11/1993 | Rowe et al. | 222/146.6 X |

*Primary Examiner*—William E. Tapolcai
*Attorney, Agent, or Firm*—Akin, Gump, Strauss, Hauer & Feld

[57] ABSTRACT

An apparatus for refrigerating and dispensing soft serve food products from one or more containers of product maintained at temperatures, respectively, appropriate for the products. The containers comprise flexible and impermeable bags having heat sink structures contained therein and the apparatus includes respective container receptacles and a refrigeration system having cooling sections located adjacent the respective receptacles wherein the cooling sections are aligned with the heat sink structures of the containers when the containers are seated within the receptacles. Adjustable refrigerant controls are provided for controlling the flow of refrigerant to the respective cooling sections and a monitoring system, including pneumatic and electric control circuits, provides signals corresponding to the volume of space in a container receptacle external of the flexible bag to detect the existence of an empty or nearly empty container. The monitoring system includes a comparison and logic circuit as well as signal generators for indicating that a product container is empty. The refrigerant system is also operable in a defrosting mode for raising the temperatures of the products in the respective containers and for deicing the containers and receptacles.

19 Claims, 9 Drawing Sheets

CHILLED PRODUCT DISPENSING APPARATUS

FIELD OF THE INVENTION

This invention relates to chilled product dispensing apparatus and, more particularly, to apparatus for dispensing chilled or soft frozen food products such as ice creams, frozen yogurts, custards, and the like.

BACKGROUND OF THE INVENTION

Apparatus for dispensing soft frozen food products are of commercial interest for installations in retail establishments, wherein they are operated by customers or employees for dispensing soft frozen products into individual containers such as serving dishes or edible cones. Soft serve products, i.e., chilled or soft frozen products, are maintained within such a dispensing apparatus at a temperature which is not so low as to prevent the extrusion of a continuous stream or ribbon of the mixture, yet not so high that the extruded product is sufficiently fluid that it does not retain its shape for a period of time in the container.

It is thus important that such a soft serve product is maintained within a temperature range which is appropriate for dispensing the particular product. Typically, this may constitute a range of only several degrees, falling between about 0° F. to 20° F. for soft frozen confections such as ice creams and yogurts, but the range may differ with respect to different types of products. For example, temperatures suitable for the dispensing of products with relatively high fat contents, such as ice creams, are lower than those appropriate for low-fat products, such as dietetic yogurts and the like. Excessively low temperatures often have deleterious effects upon the taste and consistency of the product, which may crystallize and become undesirably hard and which may not flow consistently during operation of the dispensing apparatus. The temperatures at which such soft frozen confections are maintained for dispensing the products are thus rather critical, and they are somewhat higher than those preferred for storing the products.

BACKGROUND OF THE PRIOR ART

Refrigerated soft serve mixing and processing apparatus of a first type have been developed which are operable to process and freeze the products on-site, suitably at retail establishments in which the products are to be sold to the public. In such apparatus a liquid mix is typically converted into a soft frozen confection by lowering the temperature of the mix within a refrigerated vat while stirring the mix with an agitator or dasher. However, such on-site production of soft serve products entails a number of disadvantages and difficulties. First, processing the liquid mix and bringing it to a desired subfreezing temperature is inconvenient and time consuming. Also, the dasher assembly and other movable components in such an apparatus must be periodically cleaned and serviced, and the mechanical drive mechanism required for operating the dasher includes a number of moving parts which may be subject to malfunctions. The liquid mixtures utilized in such apparatus are more susceptible to bacterial contamination than is the case with products which are consistently maintained in a frozen state, and, accordingly, cleaning and disinfecting of the components must be performed frequently if bacterial contamination is to be avoided. Further, since such on-site processing systems typically are operated by various employees of local retail establishments, it is difficult to maintain consistent quality control, and the resultant product may be inferior in taste and consistency to one which is processed in a central location, under carefully controlled conditions, and shipped to the retail establishment in frozen form. For example, the process of air entrapment within the mix by the rotating dasher as the mix is cooled to a freezing temperature is difficult to perform consistently in such on-site processing apparatus, often resulting in the product having insufficient air entrapment. Thus, the product may not have the desired consistency, and the yield is reduced, which may affect the ongoing costs and profitability of the installation.

Accordingly, a second type of soft frozen product dispensing apparatus has been devised in which the product is shipped in suitable containers in pre-processed, hard frozen form, suitably at sub-zero temperatures, and "tempered", or brought to somewhat higher, serving temperature ranges (e.g., 10° F. to 20° F.) within the dispensing apparatus. In such systems, the mixture normally is shipped within containers which are adapted to be removably inserted within a refrigerated cabinet, and means have been provided for dispensing the mixture through one or more dispensing nozzles formed in a panel or door of the cabinet. In such pre-processed soft serve dispensing apparatus, the product is thus prepared and processed in a central facility, and a high degree of quality control may thereby be maintained. Moreover, such dispensing apparatus are conveniently operated as self service units, wherein a customer may dispense the product into a serving container by actuating a valve on the apparatus.

However, such pre-processed soft serve dispensing apparatus also have entailed a number of disadvantages and limitations. For example, it is highly desirable from a marketing standpoint that a variety of soft serve products be made available to potential customers. However, as previously mentioned, temperatures appropriate for dispensing certain types of confections are not suitable for confections of other types. Accordingly, when it has been desired to dispense a variety of products having differing characteristics, it has not been conveniently possible to maintain such products at respectively appropriate temperatures within a single dispensing unit.

One means for serving different types of soft serve products is to provide multiple dispensing units, each with an independently controlled refrigeration system for maintaining each product within its appropriate temperature range. Or, a single unit can be employed in which several soft frozen products are maintained at a single temperature which represents a compromise for one or more of the products, albeit resulting in the previously mentioned deleterious effects upon the taste and consistency of the product. The first alternative is undesirably expensive, entailing the initial costs of multiple refrigerated units and substantial continuing expenses related to power consumption and maintenance. Moreover, such multiple refrigerated units would require an excessive amount of floor space, which is also competitively disadvantageous, particularly for small business establishments. The second alternative is clearly undesirable from the standpoints of product quality and customer satisfaction. Accordingly, there is a need for a soft frozen food product dispensing apparatus in which containers of soft frozen products of differing types may be conveniently maintained at selected temperatures appropriate for each type of soft serve product.

A further disadvantage of existing systems of the type adapted to dispense previously processed frozen products is that the entire interior volume of the cabinet or housing in which containers of soft frozen product are housed is required to be maintained under refrigeration, within a desired temperature range. The necessity for maintaining a consistent, precisely controlled temperature throughout the cabinet presents technical difficulties, and the costs of electrical power for continuously refrigerating the entire cabinet at subfreezing temperatures are substantial. Further, the generally cylindrical containers of pre-processed frozen confections may tend to become adhered to chilled receptacles or other components within the dispensing unit, because of the freezing of condensation which may form between the containers and adjacent components, whereby the containers tend to become adhered to components within the refrigerated units and are difficult to remove. There is thus a need for a soft frozen product dispensing apparatus in which chilled receptacles for receiving containers of soft serve product may be quickly and conveniently defrosted to permit release and replacement of the containers and cleaning or servicing of the apparatus.

A further limitation inherent in such existing soft serve dispensing apparatus relates to the difficulty of ensuring that the soft frozen product in a respective container is substantially exhausted prior to replacement of the container, and the related difficulty of monitoring the quantity of product remaining in each container to ensure that empty or "nearly empty" containers are identified and replaced in a timely and systematic manner. With respect to customer satisfaction and volume-of-sales considerations, it is thus preferable that empty or nearly empty containers are replaced by an operator or service person prior to receiving customer complaints regarding an empty, and supposedly inoperative, machine. However, it would be inconvenient, and wasteful of the product, to require the operator to monitor the dispensing units by repeatedly opening the nozzles and releasing quantities of the mixtures from time-to-time throughout the hours of service in order to detect the existence of an empty container. Thus, there is a need for an effective product monitoring system for detecting the existence of an empty or nearly empty container and providing a clearly observable or audible indication thereof, permitting replacement of the container prior to receiving customer complaints regarding such an empty container.

The containers of pre-processed soft frozen food products are typically of cylindrical configuration having a tubular housing and a flexible, impervious liner or bag extending within the tubular housing. The flexible bag typically has a closed end and an opposite, open end communicating through an outlet conduit and dispensing valve within the dispensing apparatus, and subsequently with a dispensing nozzle.

With respect to mechanisms used in prior-art apparatus for effecting extrusion of the product from such containers, in some conventional systems, the product has been dispensed by means of a piston member adapted to urge the liner and its contents toward the outlet. Such piston members, for example, have been actuated by expandable bellows mechanisms. In a typical application, a force is thereby applied against the closed end of the flexible liner sufficient to cause the liner to be translated inwardly within the rigid, tubular housing, urging the flexible liner and its contents toward the outlet. However, as the liner is pushed inwardly within the tubular housing, multiple pockets of the confection are formed within the liner as it becomes compressed and folded upon itself, and a substantial quantity of the mixture remains trapped within the folds and pockets formed in the compressed liner. It is obviously desirable that such waste of the soft frozen product be minimized, and there is thus a need for a soft serve dispensing apparatus in which substantially all of the product within such containers is exhausted from the respective containers. As will be more fully described hereinbelow, in accordance with a preferred embodiment as described in co-pending application Ser. No. 07/856,623 filed Mar. 24, 1992 and assigned to the assignee of the present application, extrusion of the mixture from such a container is effected by applying a gas under pressure to the container, externally of the flexible liner, whereby pressure is applied evenly over the external surface of the liner for exhausting substantially all of the product. Additionally, the containers heat sink structure contained within the flexible liner for preventing the occurrence of locally heated regions within the container, and adjacent its outlet, which would tend to result in an inconsistent, partially liquid product. As will become apparent from the description to follow, whereas this system entails a number of advantages over ordinary, piston-actuated extrusion mechanisms employed in conventional dispensing apparatus, precise determination of the quantity of mixture remaining in the container is difficult because of the distortion and irregularity of the flexible liner as it is compressed within the tubular housing and within the heat sink structure.

With respect to the need for monitoring such systems in order to permit timely replacement of empty containers, precise measurement of the volume of soft serve product remaining in such flexible liners is difficult, partially because of the distortion of the flexible containers during extrusion of the product. Additionally, in such systems there exists no linearly translatable piston member or the like, the displacement of which could permit a relatively convenient estimate of the degree of exhaustion of the product by means of conventional linear displacement transducers or the like. Accordingly, there is a further need for a reliable monitoring system capable of providing an indication of an empty or "nearly empty" container in such soft frozen product dispensing apparatus.

In conventional, soft frozen product dispensing apparatus, dispensing of the soft frozen product is controlled by various types of valving mechanisms. Some systems have employed manually operated, proportionally actuable valves, wherein a customer may adjust the valve by a desired degree, generally by shifting a handle operably connected to a valve element. However, such manually actuated dispensing systems entail certain disadvantages, particularly when the soft serve dispensing apparatus is to be used in a self-service mode wherein customers using the machine may not be familiar with its operation or with the fluid characteristics of the mixture as it is extruded. For example, a customer may have difficulty in controlling such a proportionally actuable valve to achieve a desired rate of flow of the mixture. Further, the customer, through negligence or because of a lack of familiarity with the apparatus, may spill the product and may not promptly close the valve to shut off the flow, resulting in unnecessary loss of product. Such product loss is, of course, of major concern with respect to profitability and with respect to the commercial viability of such apparatus for customer operated installations. There is thus a need for a soft serve dispensing apparatus having an improved valving and shutoff system for controlling the extrusion of soft serve confections, wherein the dispensing valve is normally closed, and is automatically returned to a closed position after use unless purposefully maintained in an open position by an operator, and wherein gas under respectively appropriate pressure levels is applied for actuating the dispensing valves and for ejecting the soft serve product.

OBJECTS OF THE INVENTION

It is, accordingly, a major object of the present invention to provide a new and improved apparatus for refrigerating and dispensing soft serve food products.

Another object of the invention is to provide such a soft serve product dispensing apparatus which is conveniently operable in a self-service mode.

A further object is to provide such a soft serve product dispensing apparatus in which various types of soft serve products may be maintained at differing temperatures appropriate for the respective products.

Another major object is to provide such a soft serve product dispensing apparatus which is particularly adapted to chill and dispense soft serve products in containers of the type having an elongated flexible bag or liner containing the product, and an elongated heat sink structure, the product dispensing apparatus having cooling sections respectively located adjacent each container, in alignment with the respective heat sink structure of each container, for effectively removing heat from the soft serve product by cooling the respective heat sink structures.

Yet another object is to provide such a soft serve product dispensing apparatus having a cabinet or housing in which containers of soft serve product are maintained within respective, precisely controlled temperature ranges, but wherein it is not necessary to refrigerate the entire interior volume of the housing or cabinet.

A further object is to provide such a soft serve product dispensing apparatus which includes refrigerated receptacles or barrels for receiving respective containers of pre-processed frozen products and a system for quickly and conveniently defrosting the receptacles for facilitating replacement of the containers and servicing of the apparatus.

Yet another object is to provide such a soft serve product dispensing apparatus which includes an effective monitoring system for detecting the existence of an empty or nearly empty container of the soft frozen product, and which includes means providing an indication to an operator of the existence of an empty or nearly empty container, thereby permitting replacement of such containers in a timely manner.

A related object is to provide such a self-service, soft serve dispensing apparatus which includes a product dispensing valve which is normally closed and which may be conveniently opened by a switch actuated by a customer, and wherein the dispensing valve returns to a closed position upon release by the customer of the product dispensing switch.

A further, related object is to provide such a valve actuating system which includes means for damping the operation of the valve actuating mechanism during opening and closing of the valve to minimize physical shock and noise during operation of the product dispensing system.

Further objects and advantages of the invention will become apparent from the specification and accompanying claims and from the accompanying drawing.

SUMMARY OF THE INVENTION

In accordance with one preferred embodiment of the invention, a soft serve product dispensing apparatus is provided which is adapted to dispense pre-processed soft frozen food products of several types and consistencies, maintaining containers of the respective soft serve products at differing temperatures appropriate for dispensing the respective soft serve products. A selectively controllable refrigeration system is provided in which a coolant is conducted through multiple supply conduits to respective cooling units, which include receptacles in which the respective containers of soft frozen products are removably seated.

In accordance with another aspect of the invention, coolant is conducted to respective product container receptacles, and a defrosting system is provided having selectively controllable communication between a compressor section and the container receptacles. The defrosting system is operable for selectively conducting heated, pressurized coolant through cooling sections adjacent the respective receptacles for heating and defrosting the receptacles, thereby facilitating removal and replacement of respective containers of product seated within the receptacles, and servicing of the apparatus.

In accordance with still another aspect of the invention, a pneumatic actuation system is provided for applying a pressure differential within the respective containers of soft frozen product which is effective to cause the product to flow in a steady stream through an outlet conduit and dispensing nozzle, a normally closed dispensing valve being provided for controlling the flow of soft serve product through the dispensing nozzle. Electrical and pneumatic control systems are provided for effecting opening of the valve in response to closing of a normally open actuating switch, and a control system is provided which ensures that appropriate actuating pressures are maintained within a container of the product when the switch is actuated and for a predetermined time interval thereafter. In a preferred embodiment, means are provided for damping movement of the valve element. In one preferred embodiment, the damping system includes a pneumatic and hydraulic damping system.

In accordance with a further aspect of the invention, an electrically and pneumatically controlled system is provided for introducing gas under a first pressure from a first tank for effecting extrusion of a soft frozen product, and for supplying gas under a second, relatively higher pressure, contained in a second tank, for actuating a product dispensing valve to control the flow of a soft frozen product, and wherein a pneumatic control and valving system is provided for supplying gas under pressure from a single source of gas under pressure, such as an air compressor, to the two tanks.

In accordance with yet another aspect of the invention, an electronically and pneumatically controlled system is provided for detecting the existence of an empty or nearly empty product container and providing an indication of such a condition to permit timely and systematic replacement of empty product containers. A control system and logic circuit is provided for determining the existence of a predetermined interior volume of gas within a respective product container which is indicative that the volume within the container, but external of the flexible liner, has become greater than a predetermined value corresponding to a "product-empty" condition. The existence of such an empty volume within a product container and external of the flexible liner is determined by a pneumatic and electronic system which is operable to introduce gas under pressure within the respective food product containers and then to permit release of the gas under pressure through a restrictive orifice, while sensing the time required for the pressure of the gas to fall by a predetermined increment as it is exhausted through the restrictive orifice, comparing the time delay with a predetermined reference delay period, and providing a "product empty" signal when the predetermined delay period is exceeded. In one preferred embodiment, the restrictive orifice is adjustable for permitting calibration or adjustment of the system.

BRIEF DESCRIPTION OF DRAWINGS

For a more complete understanding of the invention, reference should be made to the accompanying drawings, wherein.

DESCRIPTION OF THE PREFERRED EMBODIMENTS

Figure 1:
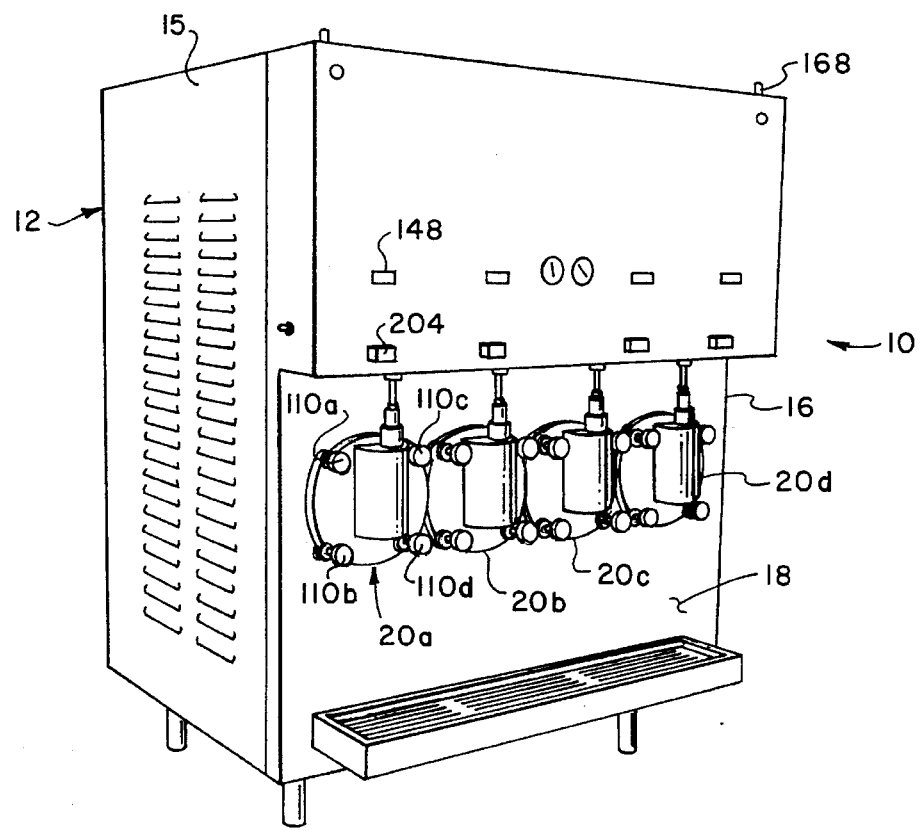
FIG. 1 is a perspective view of the soft serve confection dispensing apparatus showing the dispensing head assemblies and controls.

In the description to follow, like parts are designated throughout the specification and drawings with the same reference numerals, respectively. The drawings are not necessarily to scale, and in certain views portions have been exaggerated for purposes of clarity.

With respect to the individual temperature controlled cooling barrels or receptacles, the apparatus includes means for maintaining frozen food mixtures within individual, removable containers at selectively controlled temperatures within suitable temperature ranges. With respect to a frozen yogurt mixture, for example, a temperature range of 10–20 degrees may be typical. Other products may require other temperatures, which may range from 0° F. to 50° F.

With initial reference to FIG. 1, the chilled or soft frozen food product dispensing apparatus 10 of one preferred embodiment of the invention suitably includes a cabinet 12 suitable of rectangular configuration having an upper front panel 14 which is connected to sidewalls 15, 16, and a lower front panel 18 on which product dispensing head assemblies 20a, 20b, 20c, 20d are removably mounted.

Figure 2:
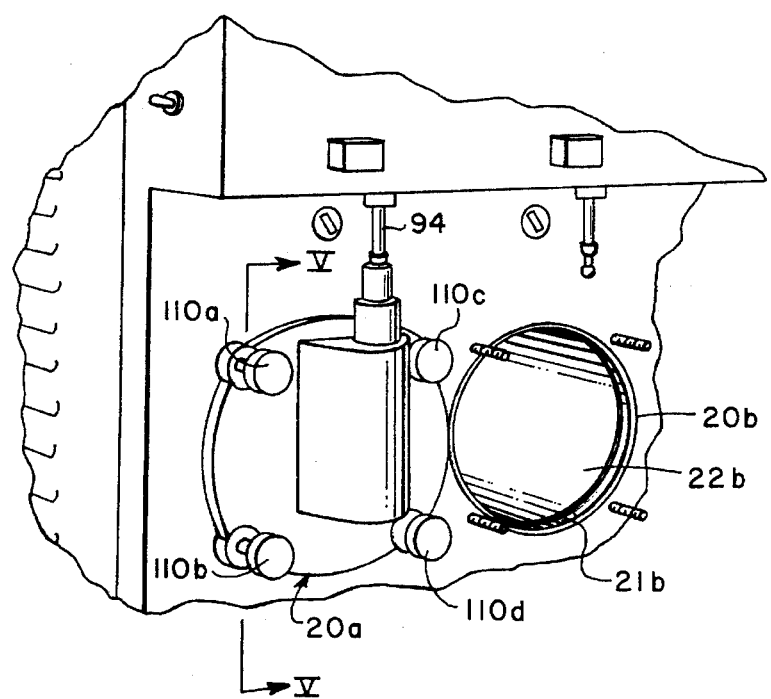
FIG. 2 is a perspective, fragmentary view, in an enlarged scale, showing two of the product container cooling units, and wherein one of the head assemblies has been removed to reveal the corresponding product container receptacle.
Figure 3:
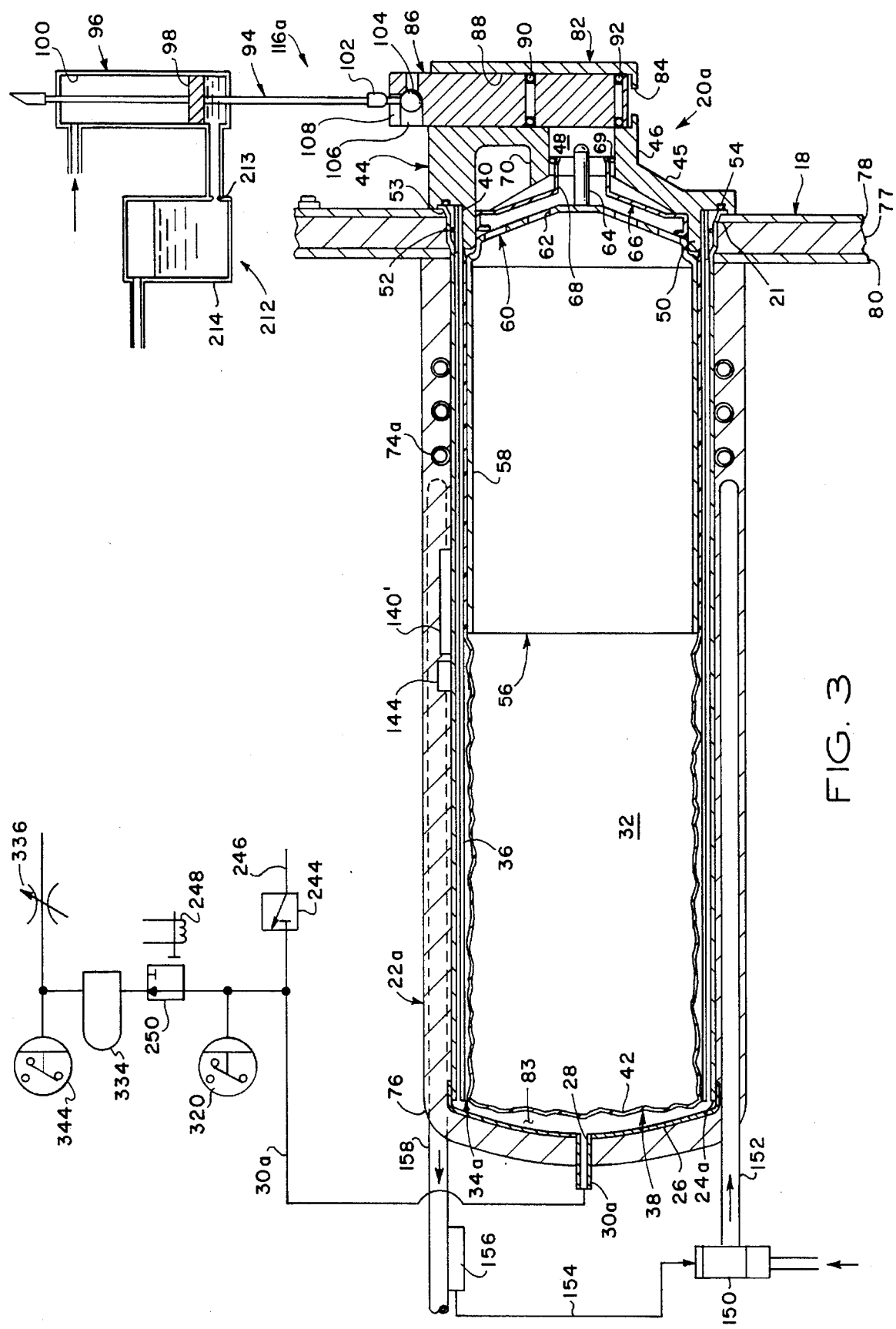
FIG. 3 is a longitudinal, sectional view of one of the product container receptacles showing one of the containers of soft serve product seated therein and also showing portions of the respective head assembly and dispensing valve, wherein the thicknesses of the container and receptacle walls have been exaggerated for clarity, and showing in diagrammatic form portions of the pneumatic and hydraulic actuation and damping systems.

In the preferred embodiment, and as will be more fully described hereinbelow, product dispensing head assemblies 20a, 20b, 20c, 20d are removably mounted on the front panel 18 adjacent respective openings 21 (FIG. 2) formed in the lower panel 18, in sealing engagement with the outer ends of respective chilled, cylindrical product receptacles (FIG. 3), which extend rearwardly within the cabinet 12 from front panel 18. Referring to FIG. 3, a first chilled product receptacle 22a, as typical, includes a cylindrical product barrel 24a, preferably of stainless steel or aluminum, having a forward end portion mounted within corresponding opening 21 formed through front panel section 18, and a rearward end portion sealingly mounted within an annular cover or cap member 26. Cap member 26 has a centrally formed opening 28 communicating with a rearwardly extending, high pressure conduit 30, for reasons which will become apparent from the description to follow.

With continued reference to FIG. 3, soft serve product 32, which for illustrative purposes in the present description will be considered to be a soft frozen dietetic yogurt confection having a preferred serving temperature range of about 15° F. to 20° F., is contained within a cylindrical product container 34a which is removably seated within the cylindrical, chilled product receptacle 22a. Product container 34a includes an elongated, rigid, tubular housing member 36, adapted to seat within the cylindrical barrel 24a of chilled receptacle 22a, the tubular housing member having an outer diameter slightly smaller than the inner diameter of the chilled product receptacle barrel 24a for permitting sliding insertion of filled product containers within the barrel, and removal of empty containers. The tubular member 36 is suitably formed of a helically wound, rigid cardboard or paper material, or it may be of other thin, stiff, lightweight materials. A flexible, elongated, impervious bag 38, suitably of 4 mil polyethylene material, extends rearwardly within the tubular housing member 36 and has a forward, open end portion 40 which is folded over the forward end of tubular member 36, and a rearward, closed end portion 42 which extends across the tubular member 36 adjacent the end cap 26 when the product container 34 is filled with the soft serve product 32, as seen in FIG. 3. During transport or storage prior to insertion within the chilled product receptacle 22a, the open end portion 40 of product bag 38 is protected by a removable cover, not shown, fitted over the forward end of tubular member 36.

The head assembly 20a is suitably formed of a rigid plastic material such as polypropylene or acrylic, and has a rearwardly open housing portion 44 of generally cup-shaped configuration adapted to fit sealingly over the barrel 24a, and the housing 44 having a semi-frustoconical lower wall portion 45 coaxial with a forwardly projecting, cylindrical extension portion 46 defining a dispensing port 48. The housing 44 has a rearwardly projecting, peripheral annular flange portion 50 which is adapted to seat coaxially within the forward end portion of the container tubular housing member 36, thereby fitting tightly within the folded over forward end portion 40 of the flexible bag 38 for effecting sealing engagement between the bag 38 and an annular seal 52, which is press fitted within an outwardly flanged forward portion 53 of the receptacle barrel 24a and which encircles the tubular member 36. Because of the outwardly flanged end portion 53 of barrel 24, the resilient seal 52 is pressed securely into sealed relation with the confronting surfaces of the barrel flange 53 and overlapped portion 40 of bag 38 upon the head assembly 20a being urged against the product container receptacle 22. Additionally, a second O-ring seal 54 is seated within a corresponding annular groove formed in an annular, rear wall of housing 44, in register with the forward, portion 53 of cylindrical receptacle barrel 24a.

Figure 4:
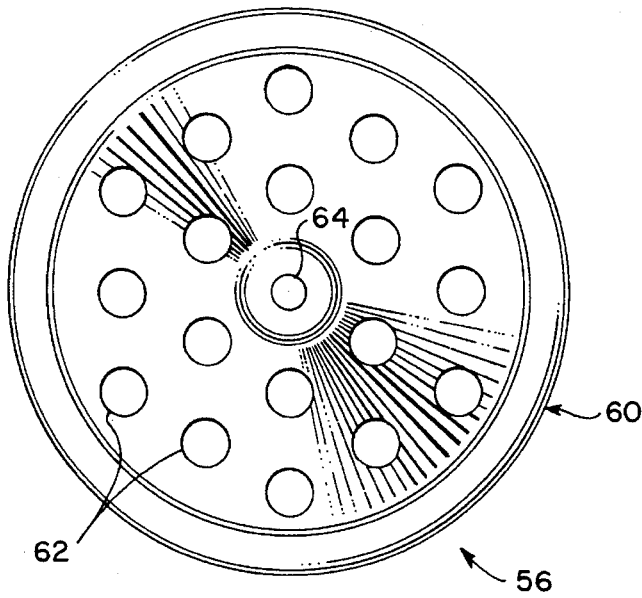
FIG. 4 is an end view of the extrusion head of the heat sink dispensing tube.

As disclosed in co-pending application Ser. No. 07/856, 623, filed on Mar. 24, 1992, the cylindrical product container 34a, in its preferred embodiment, also includes a heat sink dispensing tube structure 56 contained within the bag 38. The heat sink structure 56 includes a tubular barrel portion 58 extending rearwardly within the flexible bag 38 from its forward portion 40, and extending coaxially of the product container tubular member 36. A perforated extrusion head portion 60 of the heat sink structure 56 extends across the forward end of barrel portion 58. As seen more clearly in FIG. 4, the extrusion head portion 60 includes a plurality of openings 62 through which the frozen confection 32 may flow when the product is dispensed. An extrusion head projection member 64 extends forwardly from the extrusion head 60 and coaxially within the product dispensing port 48. The heat sink dispensing tube structure 56 is constructed of a material having a high coefficient of thermal conductivity, such as aluminum, and one of its purposes is to create a thermal heat sink for ensuring that the temperature of the soft serve product 32 remains substantially consistent within the dispensing port 48. Without the heat sink structure 56 the soft serve product would be subject to localized heating since the head assembly housing 44 is exposed to the nonrefrigerated environment external of the cabinet 12. As discussed in the above-referenced, copending application, the heat sink dispensing tube structure 56 preferably extends within the receptacle barrel 24 for a distance equal to about 50 percent of the length of the barrel for effective dissipation of heat within the product container and the outlet port 48. Additionally, an insulating cone member 66 of generally frustoconical configuration is coaxially seated within the inwardly projecting flange portion 50 of the head assembly housing 44 and includes a forwardly projecting cylindrical extension 68 extending coaxially within the dispensing port 48, the cylindrical extension 68 being sealingly seated, by annular seal 69, within cylindrical portion 70 of the dispensing head assembly 20a.

As will be understood more fully from the description hereinbelow, a helical cooling coil 74a of high pressure tubing, suitably ¾-inch copper tubing, encircles the cylindrical barrel 24a of chilled product receptacle 22a at a location adjacent the heat sink dispensing tube 56. As will be described hereinbelow with reference to FIG. 6, a refrigerant, such as freon 502, may be conducted through the cooling coil 74a for cooling the receptacle 22 and its contents, whereby heat is withdrawn from the cylindrical barrel 24a, the tubular member 36, the heat sink dispensing tube 56 and the soft frozen confection 32 within container 34 and dispensing port 48, thus dissipating heat within these 74a, 74b, 74c, 74d (FIG. 6) elements away from the product dispensing pathway. As will be more fully discussed hereinbelow with reference to FIG. 6, cooling coil 74a, and cooling coils 74b, 74c, 74d (FIG.>6) institute evaporator sections in which refrigerant is permitted to evaporate for cooling the respective product container receptacles 22. Thus, the soft serve product 32 is cooled by cooling coil 74a and is prevented from becoming heated, and softening, by the heat sink dispensing tube structure 56. Additionally, the product container receptacle 22a is insulated by means of an insulating Jacket 76, suitably formed of a closed-cell foamed material, extending around the cylindrical barrel member 24a and the cooling coil 74a and extending rearwardly around the cap member 26. Similarly, the front panel 18 of the cabinet 12 is insulated suitably including an internal layer 77 of closed cell insulating material sandwiched between front and rear metal sheets 78, 80.

A second function of the heat sink dispensing tube structure 56 is to support the flexible bag 38 to prevent premature collapse of the bag and to ensure that it collapses in upon itself over the rear edge of the heat sink dispensing tube upon pressure being applied to urge the flexible bag 38 forwardly within barrel portion 58.

As will be more fully described hereinbelow, in operation, the soft serve confection 32 is urged forwardly and caused to flow through the openings 62, within extrusion head 60, and subsequently through the cylindrical projection 68, the dispensing port 48, and product dispensing valve assembly 82. Pressure is applied over the external surface of the flexible bag 38 by the introduction of a gas under pressure within the interior volume 83 of chilled product receptacle 22, external of the bag 38, and differential pressure across the bag thereby effects extrusion of the product 32 through dispensing nozzle 84, upon valve assembly 82 being open.

Valve assembly 82 includes an elongated, cylindrical piston valve member 86 slidably seated within a valve chamber 88 vertically formed through head assembly 20a. In its closed position as shown in FIG. 3, the valve member 86 extends across the dispensing port 48, upper and lower O-ring seals 90, 92 being seated within respective annular grooves coaxially encircling the valve member 86 and located above and below the dispensing port 48, for preventing leakage of the soft serve product 32 when the valve member is in its closed position. The upper end portion of valve member 86 is connected with the lower end of a piston rod 94, which extends upwardly within an actuator 96, and is connected to piston member 98, which is slidably seated within chamber 100 of the actuator 96. The piston rod 94 is connected at its lower end portion to draw valve coupling 102, which is connected to valve member 86 by means of a ball member 104 seated within a socket 106 formed in the upper end portion of valve member 86, through a keyhole slot 108 which permits convenient disassembly and removal of the piston rod 94 from the piston valve member 86 for ease of cleaning and assembly.

Figure 5:
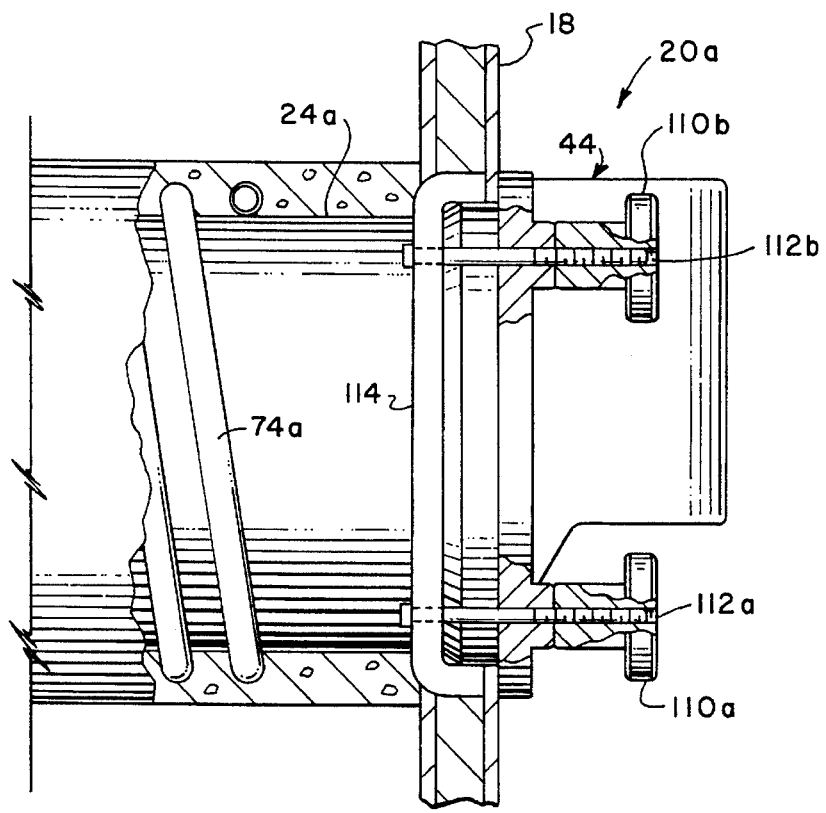
FIG. 5 is a fragmentary, partially sectional view taken as on line V—V of FIG. 4, showing the attachment mechanism for removably mounting the first head assembly on the cabinet, in sealing engagement with one of the chilled product receptacles.

With reference to FIG. 5, the dispensing head assembly 20a is removably mounted on the cabinet lower wall portion 18, in sealing engagement with the outer end of the receptacle barrel 22a, by means of flanged nuts 110a, 110b which are threadingly engaged with outwardly projecting bolts 112a and 112b. Bolts 112a, 112b are suitably fixedly mounted within a vertical bracket member 114 which is welded or otherwise rigidly affixed to one side of the cylindrical barrel 24a. A second bracket member, not shown, is welded to the opposite side of the barrel 22a for supporting bolts which are threadingly engaged by the third and fourth flanged nuts 110c, 110d (FIG. 2). Upon the flanged nuts 110 being tightened against the head assembly housing 44, the annular seals 52, 54 (FIG. 3) are brought into sealing contact with the flanged end portion 53 and the folded over portion 40 of the bag 38 for effecting sealing engagement between the bag 38 and receptacle barrel 24a.

In normal operation, the containers 34 of pre-processed soft serve product are supplied in hard frozen form. During processing of the mixture, normally in a central facility, the soft frozen product 32 is poured into the flexible bag 38, and the open end of the bag is temporarily sealed in a removable cover while the product is hard frozen. The frozen food product may then be shipped, and stored, until such time as it is tempered and placed into the receptacle 22, wherein it is maintained at a higher temperature in a soft serve consistency for permitting dispensing of the product through the dispensing nozzle 84.

REFRIGERATION SYSTEM

Figure 6:
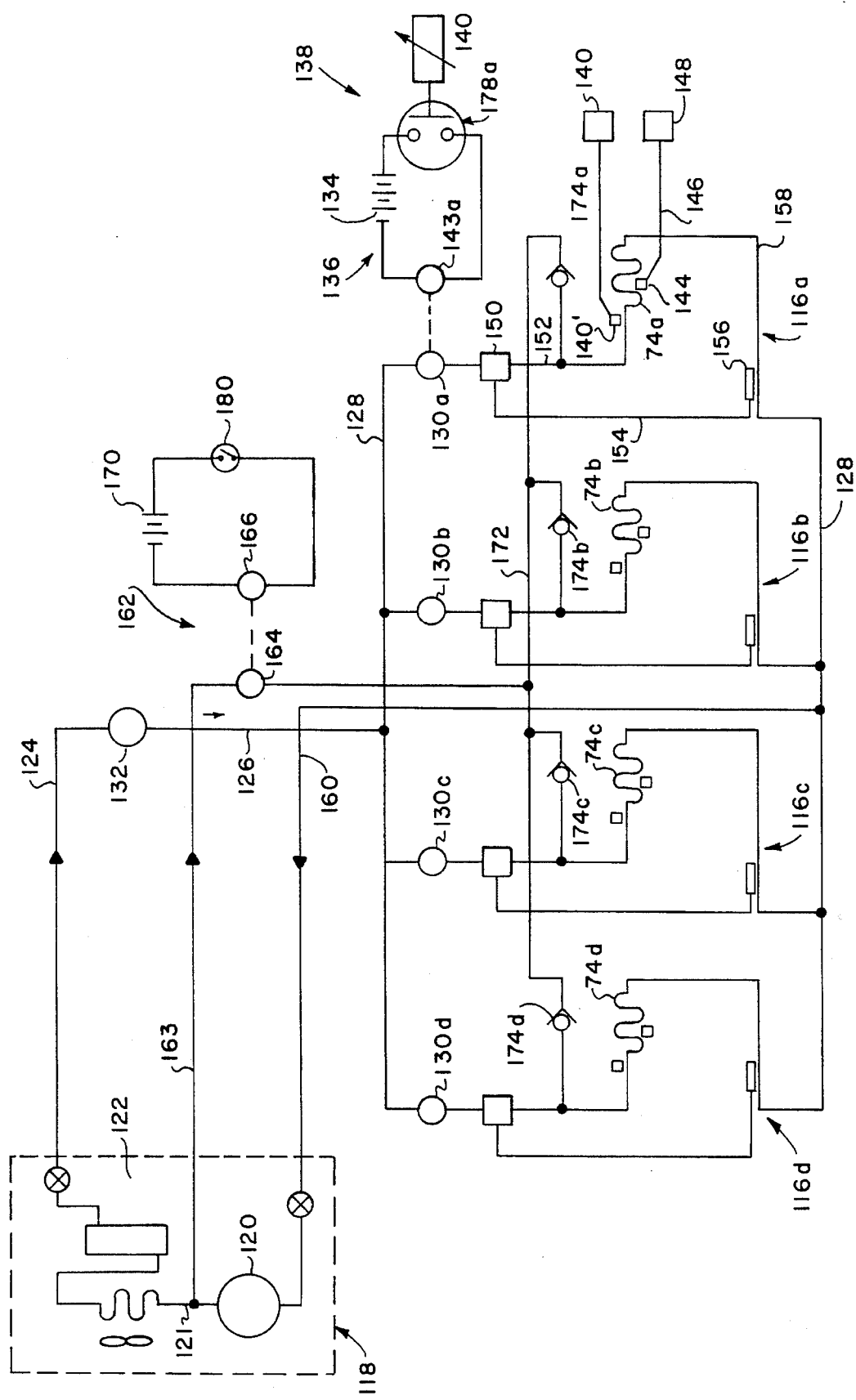
FIG. 6 is a schematic diagram showing portions of the cooling system, the defrost system, and associated control elements.

Whereas in prior systems having multiple nozzles and product containers it has been necessary to maintain differing soft serve mixtures at the same temperature, in the apparatus 0 of the present invention, selective control of the temperatures of each of several containers of soft serve product is provided. With reference now to FIG. 6, in accordance with one preferred embodiment, individual control of the temperatures of multiple (four) respective food containers is provided by controlling the flow of coolant to evaporator coils 74a, 74b, 74c, 74d of each refrigerated product dispensing unit 116a, 116b, 116c, 116d. A single refrigerant condensing unit 118 is provided having a compressor 120 connected through conduit 121 with a condenser unit 122. A commercially available condensing unit 118 such as Model MSYL-0027, manufactured by the Coplend Corporation is suitably employed for compressing and condensing the refrigerant, whereby the refrigerant may be conducted under high pressure, in liquid form, to the evaporator coils 74a, 74b, 74c, 74d. By way of example, the condensing unit 118 includes a compressor 120 driven an electric motor, not shown, of one-quarter horse power. The refrigerant, in high pressure gaseous form, is conducted along connecting line 121 to the condenser unit 122, which condenses it to liquid form and transmits it through outlet line 124 and liquid coolant supply line 126 to a manifold line 128 connected to first, second, third and fourth solenoid valves 130a, 130b, 130c, 130d. A drier unit 132, suitably drier unit DX 052 manufactured by the Danfoss Corporation, is connected in series between outlet line 124 and supply line 126 for removing any moisture from the refrigerant.

With respect to the first product cooling and dispensing unit 116a, as typical of units 116b, 116c, 116d, the solenoid valve 130a is actuated by power supply 134, suitably a 24 volt AC source, within a control circuit 136, to be described. An adjustable thermostatic control unit 178a is provided including an adjustable thermostat 140 operatively connected to a normally open switch connected in series with power supply 134 and the coil 143a of solenoid valve 130a. The thermostat 140 is adjustable by an operator for selecting a desired temperature for a given product, to be refrigerated and dispensed by the respective product dispensing unit 116a.

The thermostatic temperature control unit 138 thus includes an adjustable thermostat 140 controlling a normally open electrical switch 178a connected in series with power source 134, and solenoid valve 130a. As shown in FIG. 3, the thermostat sensor 140' is preferably mounted internally of the insulation jacket 74 adjacent the stainless steel barrel 24 for sensing the temperature of the barrel 24 and the adjacent product 32. The thermostat 140 is selected for the temperature range desired, and in the present embodiment a thermostat such as Model No. 2E740 manufactured by The Dayton Corporation and having a range of −30° F. to 70° F., is suitably employed. The thermostatic temperature control unit 138 of FIG. 6 is shown by way of example, and similar, corresponding units are provided for actuating the solenoids 130b, 130c, 130d of each of the cooling coils 74a, 74b, 74c.

A thermocouple 144 is similarly mounted within the insulation Jacket 76 adjacent receptacle barrel 24 (FIG. 3), and is connected by lead 146 (FIG. 6) to an external digital thermometer 148, which, as seen in FIG. 1, is suitably mounted on the cabinet front panel 14 adjacent the respective head assembly 20a. Similar thermometers and thermocouples are provided for the other product dispensing units 116b, 116c, 116d. With continued primary reference to FIG. 6, a conventional, thermostatic expansion valve 130a is connected in series between the solenoid valve 150 and the evaporative cooling coil 74a for controlling the flow of refrigerant through supply line 152 to the coil 74a, supply line 152 suitably being continuous with the coil 74a. The thermostatic expansion valve 150 is connected by tubing 154 to a power bulb sensing element 156, as shown also in FIG. 3, mounted on refrigerant return line 158. The orifice of the thermostatic expansion valve 150 is adjusted proportionally to the temperature related signal received through tubing 154 for controlling the refrigerant flow. Expansion valve 150 thus serves to maintain an efficient rate of evaporation and superheating of the refrigerant as it flows through the coil, and withdraws heat from the adjacent product receptacle 22a (FIG. 3). Refrigerant thus flows through supply line 152 in compressed liquid form and refrigerant exiting from the evaporator coil 74a returns in a vaporous state through return line 158, manifold 128 and through the low pressure suction or return line 160 to the condensing unit 118.

DEFROSTING AND TIME DELAY CONTROL SYSTEM

Figure 8:
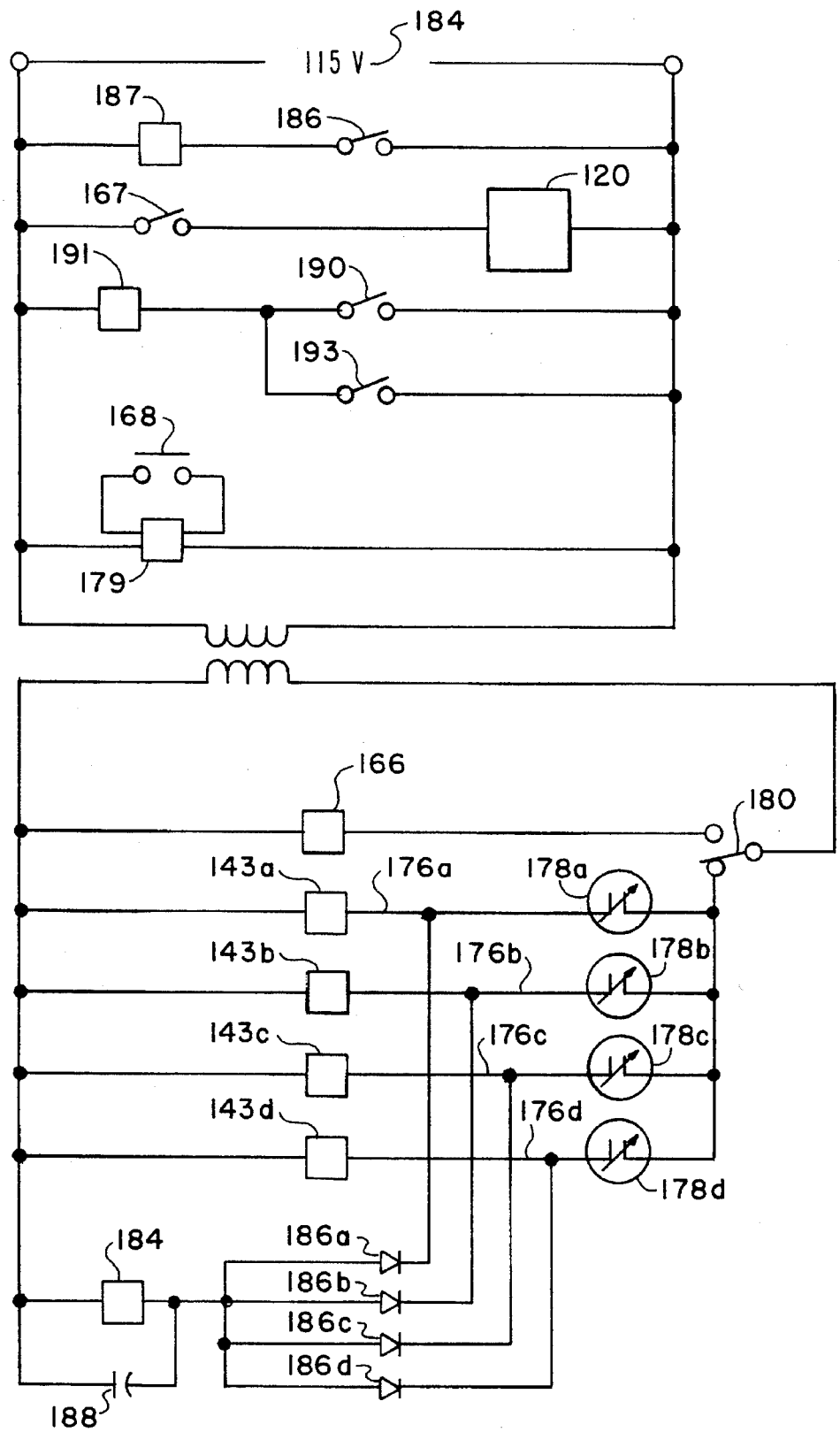
FIG. 8 is a schematic representation showing electrical components of the refrigeration system, the defrost system, and the compressor protection system.

In accordance with another advantageous feature of the present system, and with continued primary reference to FIG. 6, a defrosting system 162 is provided which employs heated refrigerant in a gaseous state, in which it has been compressed by compressor 120 but prior to being cooled by the condenser 122. After operation of the soft serve dispensing apparatus 10 for an extended period, defrosting of the receptacles 22a (FIG. 3), is occasionally necessary to free one of the product containers 34 which may have become adhered to the adjacent chilled product container receptacle 22 because of the formation of ice between the respective barrel 24 and the container 34 due to condensation on the surface of the cooled, subfreezing barrel 24 over time. The high pressure conduit 121 connected between the compressor 120 and the condenser 122 conducts refrigerant in a gaseous state, which has been compressed and heated by the compressor, to the condenser 122 for cooling and liquification. The defrosting system includes a shunting conduit 163 connected between high pressure conduit 121, through a solenoid actuated defrost control valve 164, to a defrost manifold line 172. Accordingly, heated, compressed refrigerant in gaseous form conducted from the compressor 120 through line 121 under pressures of, for example, 250 p.s.i., and at temperatures of between 100° and 140°, is conducted through line 163 to defrost solenoid valve 164, which is actuated by a normally open time delay relay 179 (FIG. 8) having normally open switch contacts 180 connected in series with a power supply 170 for controlling solenoid valve 164, which is normally closed until opened by the relay. The electrical circuitry of the defrost supply is shown in FIG. 8. Defrost switch 168 is physically positioned on the exterior of the cabinet 12 (FIG. 1) for convenient actuation by an operator. Upon being actuated by the push button operated switch 168, time delay relay 179 is energized and closes normally open relay switch elements 180 (FIG. 8) to energize solenoid coil 166 to maintain the solenoid valve 164 (FIG. 6) in an open condition for approximately three minutes, permitting heated gases to be conducted from line 163 (FIG. 6) through manifold line 172, through respective unidirectional check valves 174a, 174b, 174c, 174d, to the supply lines 152 which are continuous with respective evaporator coils 74a, 74b, 74c and 74d of product cooling and dispensing units 116a, 116b, 116c, 116d, respectively, for rapidly raising the temperatures within the evaporator coils and thereby raising the temperature of the product receptacle barrels 24 (FIG. 3) to melt any ice which may have formed between the receptacle barrels and the product containers 34, thereby freeing the containers 34 and permitting their removal. Typically, after the heated freon has been passed through the cooling coils 74 for about three minutes, the temperatures of the product receptacle barrels 24 are approximately 35°. In some instances, a subsequent three-minute cycle may be required to free a heavily frozen container. Subsequent to the three minute time delay, and normally, after the removal of the product containers 34, the solenoid valve 164 is again closed, and cooled refrigerant from condenser 122 (FIG. 6) is again conducted through the evaporator coils 74a, 74b, 74c, 74d to quickly bring the temperatures of the product container receptacles down to a preferred range of, for example, 15–20 degrees. The receptacles will thereby be cooled to operative temperatures within about 15 to 25 minutes. Unidirectional check valves 174a, 174b, 174c, 174d (FIG. 6) are provided to prevent reverse flow of the cooled refrigerant from one of the cooling coils, e.g., coil 74a, to the other coils during the refrigerant cycle, which, during normal cooling operations, would interfere with the individual temperature control effected by the respective coils.

In the preferred embodiment, means are provided for selectively adjusting the temperature within the respective product container receptacles 22 and for turning off the compressor 120 when all of the refrigerant supply solenoid valves 130a, 103b, 130c, 130d are closed, for preventing over pressurization of the refrigerant should the compressor continue to pump the refrigerant against the closed solenoid valves. Because of the multiple refrigerant supply circuits of the present system, an OR logic system is provided, as shown in FIG. 8, for sensing the closure of the respective solenoid valves 130a, 130b, 130c, 130d (FIG. 6). Referring to FIG. 8, the electrical coils 143a, 143b, 143c, 143d of solenoid valves 130a, 130b, 130c, 130d are connected in series with outlet leads 176a, 176b, 176c and 176d, which are connected to respective adjustable thermostat switches 178a, 178b, 178c, 178d, which are operable to close their respective switch elements to apply power to open solenoid valves 130a, 130b, 130c, 130d when the temperatures within the product receptacles, as sensed by their respective sensor elements 140 (FIGS. 3, 6) rise above the temperature set in the thermostats. Thus, when the thermostats 178a, 178b, 178c, 178d are closed, they are operable to emit signals to energize and open the respective solenoid valves 130a, 130b, 130c, 130d to effect cooling of the respective product container receptacles, thereby permitting adjustment, by adjusting variable thermostats 178a, 178b, 178c, 178b, of the temperature within each product container receptacle. Adjustment of the temperatures is accomplished by adjusting the thermostat settings, by rotating screws 179, as shown in FIG. 2, positioned adjacent the respective product dispensing heads.

Referring to FIG. 8, OR logic circuit, comprising relay 184, connected in series with paralleled diodes 186a, 186b, 186c, 186d, connected respectively with lines 176a, 176b, 176c, 176d, is provided for maintaining relay 184 in an actuated state, should any one of the relay switches 178a, 178b, 178c, 178d be closed wherein any one of the solenoid valves 130a, 130b, 130c, 130d (FIG. 6) are open for conducting refrigerant. When relay 184 is actuated, closing relay switch 186, actuating time delay relay 187, which closes switch element 190 which energizes power relay 191 which loses switch 167 to apply 115 V AC current to the compressor 120. Time delay relay 187 provides a 15 minute delay to prevent starting the compressor against an existing high pressure. Capacitor 188 is connected in parallel with relay coil 184 for smoothing the DC voltage applied to relay coil 184. In the event all of the switches 178a, 178b, 178c, 178d are open, whereby all of the solenoids 130a, 130b, 130c, 130d are closed, to prevent flow of refrigerant from the compressor 120 (FIG. 6), the relay 184 is deactivated, whereby the normally open switch 186 is open, turning off the compressor 120 to stop further compression of refrigerant. During the defrost cycle, the normally open switch 193, which is another relay switch element of relay 179 is closed to energize relay 191 to close switch 167, turning on the compressor 120.

PRODUCT DISPENSING AND PRESSURE REGULATING SYSTEM

Figure 9:
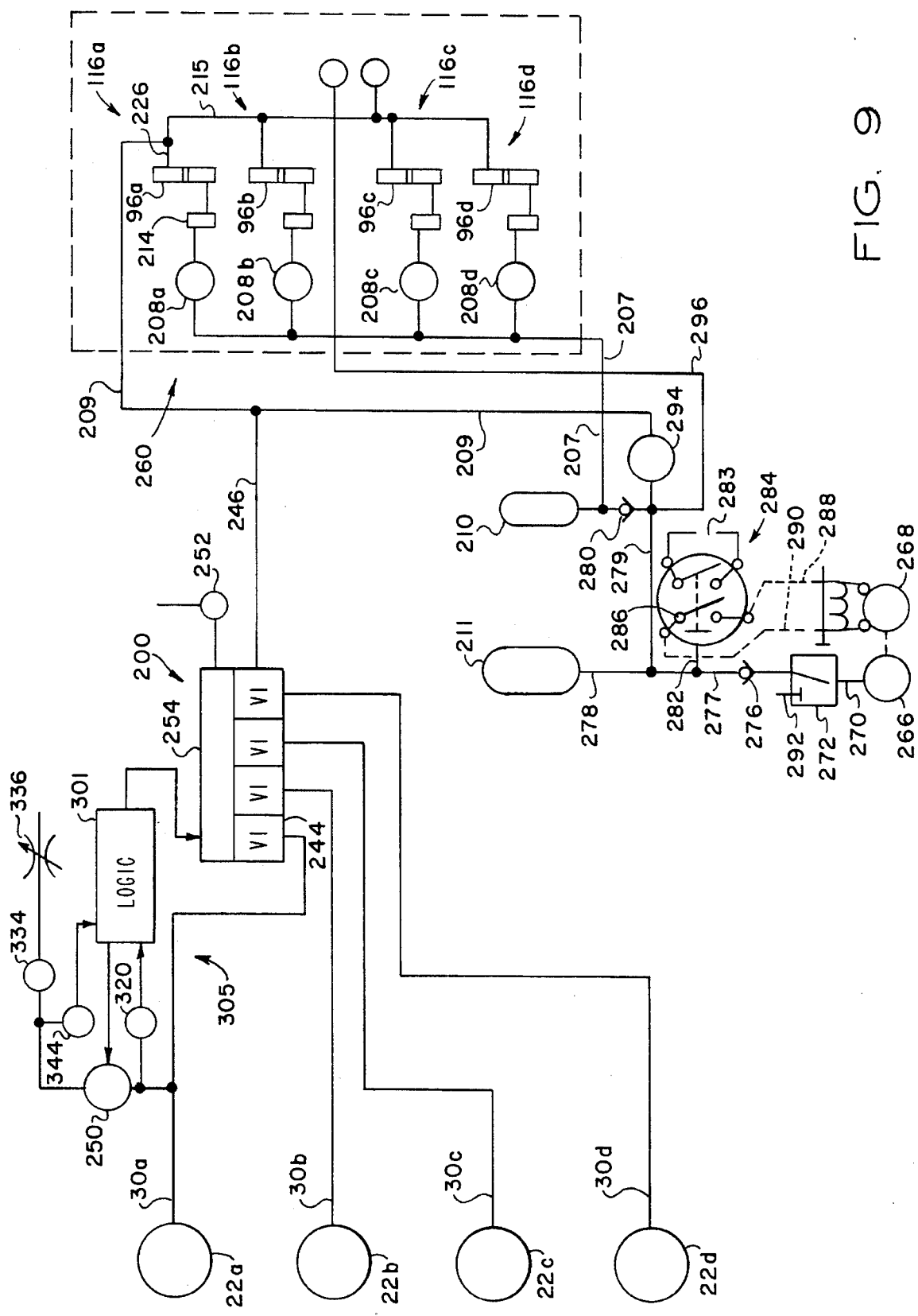
FIG. 9 is a schematic representation of the pneumatic system and the product empty monitoring system.

Referring to FIGS. 3 and 9, extrusion of the soft serve product 32 is effected by means of a pneumatically actuated system 200 which is operable to supply gas under pressure at, for example, 40 p.s.i., from a supply of air under pressure, to be described, through line 30a (FIG. 3) and liners 30b, 30c, 30d to the chambers defined within the product receptacles 22a, 22b, 22c, 22d, for urging the soft serve product 32 forwardly and outwardly through the dispensing nozzles.

Figure 7:
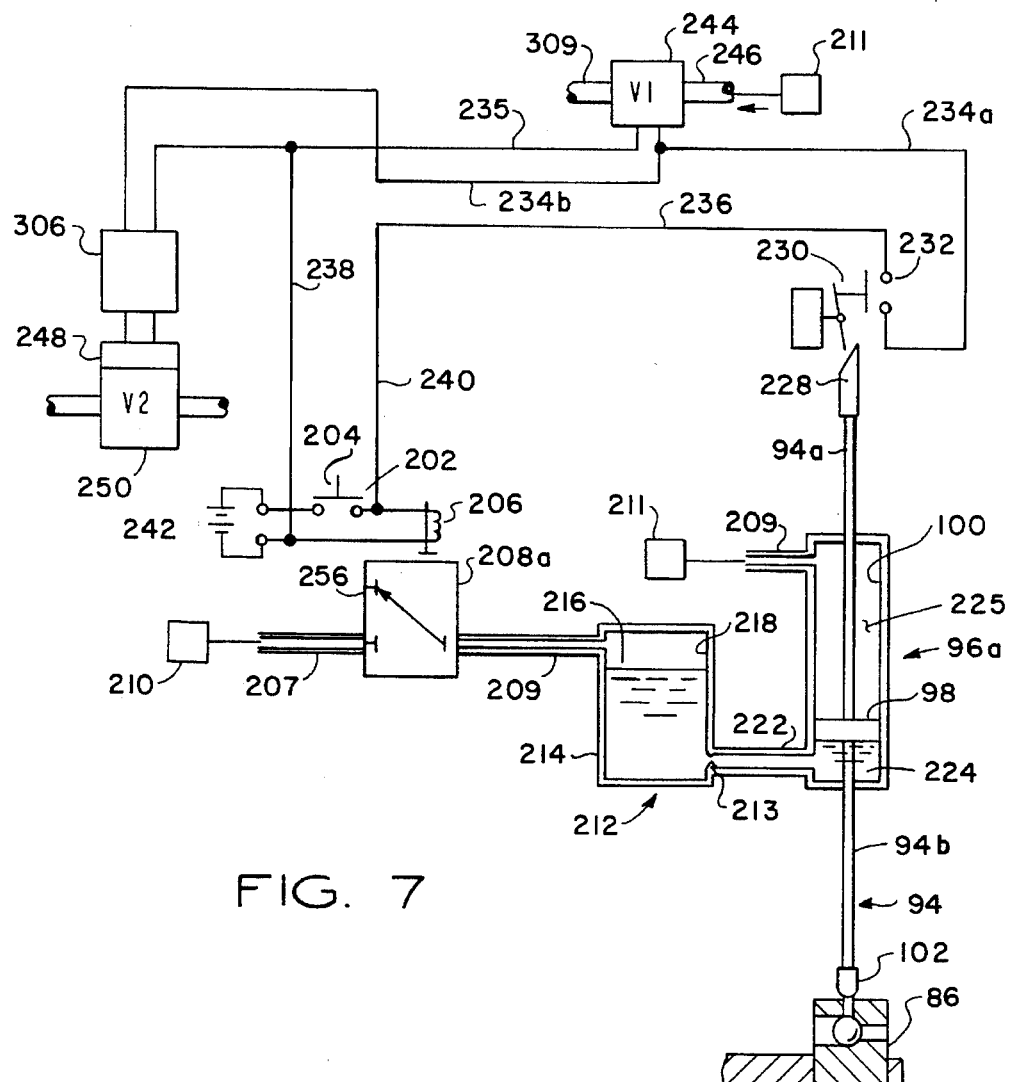
FIG. 7 is a schematic and pictorial representation of the dispensing valve actuator section.

Referring additionally to FIG. 7, the pneumatic system is also operable for actuating the dispensing valve opening and closing mechanisms. With respect to the actuating system associated with the product dispensing valve 82 of the first product dispensing unit 116a, a normally open product dispensing switch 202 is actuated by push button 204 which is conveniently located on the cabinet front panel 14, as seen in FIG. 1, adjacent the first head assembly 20a. In use, product dispensing switch 202 is depressed by a customer wishing to dispense a quantity of the soft serve product contained within the respective, adjacent product dispensing unit. As will be more fully described, in operation, so long as the push button 204 is depressed to maintain switch 202 in a closed position, the product 32 continues to flow through the outlet nozzle 84, as will now be described with primary reference to FIG. 7. Product dispensing switch 202 is connected between a low voltage DC power supply 242, and the coil 206 of normally closed solenoid valve 208, which is connected in series between a high pressure source 210 of gas under pressure, to be described. In the present embodiment, the high pressure source 210 is suitably a source of compressed air, of about 100 p.s.i., as will be described with respect to FIG. 9. High pressure gas is thus conducted via conduit 207 through solenoid valve 208a to a fluid-dampened actuating system 212 for opening the normally closed product dispensing valve 82. Fluid-dampened product dispensing valve actuating system 212 includes a fluid accumulator 214 partially filled with a supply of a stable viscous liquid 216 such as glycerine, suitably of 97 percent purity, within the reservoir 218. Accumulator 214 includes a restrictive outlet orifice 220, suitably of three to five millimeters in diameter, which is connected through conduit 222 to lower chamber portion 224 of dispensing valve actuator 96. The purpose of the accumulator 214 is to dampen the application of actuating liquid to actuator 96, as will now be described.

When solenoid valve 208 is opened, in response to closing of product dispensing switch 202, high pressure gas is conducted via conduit 207, through solenoid valve 208 to the volume 226 within accumulator reservoir 218 above the glycerine 216, and the resulting increase of pressure within the reservoir 218 forces the glycerine outwardly through restrictive orifice 220 and conduit 222, whereby glycerine is introduced into lower chamber portion 224 of the actuator 96 beneath piston member 98 for urging the piston member upwardly. Upward movement of piston member 98 effects upward movement of piston rod 94. Piston rod 94 includes an upper segment 94a and a lower segment 94b, the lower segment being connected to coupling 102 which is connected to valve member 86 of the dispensing valve 82 (as also seen in greater detail in FIG. 3). As the valve element 86 is upwardly withdrawn from dispensing port 48, the soft serve product 32 is permitted to flow through dispensing nozzle 84. The accumulator 214, with restrictive orifice 220, serve to damp the response of actuator 96 to application of high pressure air applied when solenoid valve 208 is opened. Pressure is permitted to accumulate within chamber 226, and the glycerine oil 216 flows through orifice 220 and conduit 222 in a dampened, gradually accelerating stream, whereby the movement of piston 98 and valve member 86 is correspondingly dampened.

In the preferred embodiment of the present invention, closing of the product dispensing switch 202 is also effective to effect the application of what will be termed "low pressure gas," which is suitably air under pressure of about 40 p.s.i., to the empty volume 83 within chilled product receptacle 22a (FIG. 3) for urging the flexible bag 38 and its contents forwardly through the outlet port 48 and now opened dispensing nozzle 84, as will now be described. As may be seen most clearly in FIG. 9, the upper section 94a of actuator piston rod 94 includes a tapered upper end portion defining a bevelled surface which is aligned with a microswitch element 230 operatively connected to normally open microswitch 232. Microswitch 232 is connected by conductors 234a, 234b and 236, between conductors 238, 240, conductor 238 being connected to a positive terminal of flow voltage (e.g., 24 V DC) power source 242, and conductor 240 being connected, when switch 202 is closed, to ground. Conductors 234a, 234b are connected in series with a first, $V_1$ solenoid valve 244, the valve element of which is connected by conduit 246 to the low pressure, 40 p.s.i. air source, to be described, and conduit 30 which is connected in communication, through opening 28 (FIG. 3) with the interior volume 83 within product container receptacle 22a (FIG. 3).

In operation, upon actuation of the dispensing valve 82 by closing product dispensing switch 202, as the upper segment 94a of piston shaft 94, is translated upwardly, and the bevelled surface 228 is brought into contact with microswitch element 230 for closing normally open electrical switch 232 to apply electrical power through conductors 234a, 234b to open normally closed ($V_1$) solenoid valve 244, which then communication between conduits 246, 30, permitting 40 p.s.i., low pressure gas to flow into the inner volume 83 of the product container receptacle 22a (FIG. 3). Accordingly, the soft serve product 32 is urged forwardly toward the outlet 48 and the dispensing nozzle 84 by pressure applied evenly over the entire external surface of the flexible product bag 38. Accordingly, the bag 38 is compressed inwardly and is folded inwardly within the heat sink dispensing tube structure 56 whereby the soft serve product 32 is substantially completely exhausted.

In the preferred embodiment, the closing of microswitch 230 also effects the actuation of a time delay circuit system for maintaining "low pressure gas" within the chamber 83 for a predetermined time period, e.g., for 30 minutes, as will now be described. Closing of microswitch 232 is effective to connect power supply 242 to solenoid 248, operatively connected to normally open ($V_2$) valve V250 normally open solenoid valve 250 is closed upon actuation by current conducted through the microswitch 232, in response to closing of the dispensing switch 202, and the valve 250 remains closed for a period of time subsequent to this operation, as will be described hereinbelow. As will be understood from the description to follow, closing valve 250 ($V_2$) is effective to maintain an appropriate pressure within product receptacle 22a during application of low pressure gas, i.e., 40 p.s.i. to eject the product. The purpose of the time delay system is to maintain pressure within the receptacle 22a for a preselected period of time and subsequently release and remove the pressure from the system, at a selected time after operation of the system. Thus, actuating pressure is maintained for a period of time after each use so that the product may be dispensed quickly by a subsequent customer, but operating pressure is released after the selected time period to reduce strain upon elements of the system and to extend the life span of the system and also to prevent deterioration of the soft serve product 32 which may occur if it is maintained under high pressures for an extended period of time.

With continued reference to FIG. 9, third solenoid actuated valve 208 ($V_3$) has fluid communication through conduit 207 with the source of high pressure gas, and, through conduit 224, with the accumulator 214. Coil 206 of solenoid valve 208 is connected through product dispensing switch 202 with power supply 242. (normally open push button preferably being mounted on the top or side of the cabinet for actuation by an operator.) An additional solenoid actuated relief valve 252 (FIG. 9) is suitably provided in connection with a common exhaust chamber 254 for permitting the removal of low pressure gas within the system when it is desired to remove the head assemblies 20 for serving or, for replacement of empty food containers with full containers.

When the customer or operator has completed the dispensing of a desired quantity of product from a selected one of the units 20a, he or she releases the respective push button 204 for the product dispensing switch 202, which is effective to release the associated solenoid valve, e.g., valve 208a, to prevent further supply of high pressure gas to the accumulator 212. Solenoid valve 208a is a three-way valve having an outlet 256, and when is closed, communication is provided between exhaust outlet opening 256 and conduit 209, whereupon pressure is released from chamber 218 above the glycerine fluid 216 within accumulator 214. The low pressure gas conducted through conduit 207 to the upper piston chamber 225 within actuator 96a is then effective to urge the piston 98 downwardly, forcing the glycerine liquid 216 back into the accumulator 214 and closing the product dispensing valve 82. With additional reference to FIG. 9, the pneumatic circuits of the apparatus are shown in schematic form, wherein the pneumatic system for actuating the dispensing valves 96 is shown generally at 260; wherein the pneumatic system for regulating flow of low pressure gas to the product barrels for ejecting the soft serve product is shown generally at 200, and wherein the dual pressure air supply system is shown at 264.

DUAL PRESSURE AIR SUPPLY SYSTEM

In the preferred embodiment, "high pressure" gas, for actuating the product dispensing valves 96, and "low pressure gas" for ejecting the soft serve product and actuating other components of the system, is provided by a dual pressure air supply system 264, as will now be described. With continued reference to FIG. 9, an air compressor 26b is suitably driven by an electric motor 268 of ¼ horse power the compressor assembly suitably being of 100 p.s.i. capacity. As will be understood from the description to follow, the air compressor 266 is operable to apply air under pressure to first "low pressure" tank or accumulator 211 and to second, "high pressure" tank or accumulator 210 for operating the pneumatic elements of the system. Air under pressure is conducted from the air compressor 266, through line 270 to normally closed three-way solenoid valve 272. Solenoid valve 272 is opened by the application of electrical current through its coil 274, and it is connected through one-way check valve 276, through conduits 277 and 278 to the first, low pressure accumulator 211, which is used for accumulating air under pressure, at about 80–100 p.s.i. Air under pressure in line 278 is conducted through line 278 and through one way check valve 280 to high pressure accumulator 210. Air under pressure within line 277 is also conducted through line 282 to a pressure chamber of a normally closed pressure actuated switch 284 such as Model No. 69MV6 manufactured by the Furnas Company. Pressure switch 284 includes a normally open switch 286 which is electrically connected through conductors 288, 290 to the relay coil 274 of solenoid valve 272 and to electrical motor 268 for conducting power from 115V source 283 to the motor 268 and coil 274, upon switch elements 286 being closed. Pressure responsive switch 284 is operable to open switch elements 286 and thereby interrupt power to the compressor motor 268 upon pressure within the system rising above a desired high pressure level, e.g., 100 p.s.i. Upon the pressure subsequently falling below 75–80 p.s.i., the switch 286 will be permitted to close once more, permitting current to flow to the motor for supplying air under pressure once more through solenoid controlled valve 272. Pressure within the high pressure tank 210 is also increased when the compressor 260 is in operation, until pressure within the section 264 is equalized. Such equalization occurs when pressure within the tank 210 reaches the upper limit of the compressor 266, which in the present embodiment is about 100 p.s.i. Similarly, pressure within the low pressure accumulator 211 will also reach 100 p.s.i. upon the compressor 266 continuing to run for a period of time. Three-way solenoid valve 272 serves to release pressure from the system when an upper pressure level is reached. Valve 272 is normally closed, but upon current flowing through conductors 288, 290 to the motor 268 it is energized and open, whereupon air under pressure from the compressor 266 flows through the solenoid valve 272 to check valve 276 and conduit 277. Upon pressure responsive switch 284 opening switch elements 286 because of excess pressure within line 277, power to the solenoid valve 272 is interrupted and the valve is closed, and air under pressure within line 270 is permitted to exhaust through the exhaust port 272.

Whereas both accumulators 210, 211 receive and store air compressed to high pressure levels form compressor 266 a pressure regulator 294 is provided for reducing the pressure of air supplied through low pressure supply line 207. Regulator 294 is suitably a pressure reducing regulator such as that manufactured by the Watts Company, as Model No. R364-01C, and serves to reduce pressure received on line 279 to approximately 40 p.s.i. for actuating the dispensing of soft-serve product, and subsequently losing dispensing valves 82, as has been previously described. Thus, low line 207 is connected to the upper piston chamber portions of actuators 96a, 96b, 96c, 96d. High pressure line 207 is conducted through solenoid valves 208a, 208b, 208c, 208d to the glycerine accumulators 214 for actuating the dispensing valves. A second high pressure line 296 is connected from the accumulator 211 to a high pressure gage 298. Low pressure gage 299 is connected to low pressure manifold line 215. Gages 298 and 299 are suitably mounted on the cabinet 12 for providing an indicating of the internal pressures. Whereas only one pneumatic circuit has been described, with respect to first product dispensing unit 116a, it will be understood that similar actuator circuits 116b, 116c, and 116d are also connected to the low and high pressure lines 209, 207 lines, for operation in a similar fashion.

With continued reference to FIG. 9, and in particular to the valving and control section 200, solenoid valves 244 $V_1$ are shown connected in series between the low pressure supply line 216 and through lines 30a, 30b, 30c, and 30d, to the product receptacles 221, 22b, 22c, and 22d. The supply lines 30 are also connected to 30 minute timed valves which, as previously described, will exhaust pressure through exhaust outlets from the respective lines and from the receptacles 22.

PRODUCT MONITORING SYSTEM

A further novel system is provided for indicating when the product containers 34 are nearing an empty state. As previously stated, because the system does not employ moveable pistons or the like to displace the soft serve product, conventional sensors for detecting displacement of such pistons may not be used, and an electronic and pneumatic system has been provided for detecting the residual volume 83 within the respective product containers and external of the respective flexible product bags 38. Assuming manifold valve 244 is open, whereby air under 40 p.s.i. is being supplied to the product container receptacle 22a whereby the product container is therefore pressurized at 40 p.s.i. Pressure switch 320 is operable to close a circuit when pressure within the line reaches a level of, for example, 35 p.s.i.

In summary, solenoid valve 250 is opened in response to pressure falling below 35 p.s.i. in response to a signal received from pressure switch 320. Air under pressure is permitted to flow through valve 350 and through the filter 334 and through a restrictive orifice 336 which is adjustable to control the resistance to flow. Upon pressure within the exhaust line falling below 30 p.s.i., the second pressure valve is closed, emitting a signal to the logic circuit which then is also operable to close valve 250 to prevent further loss of pressure within the system.

Figure 10:
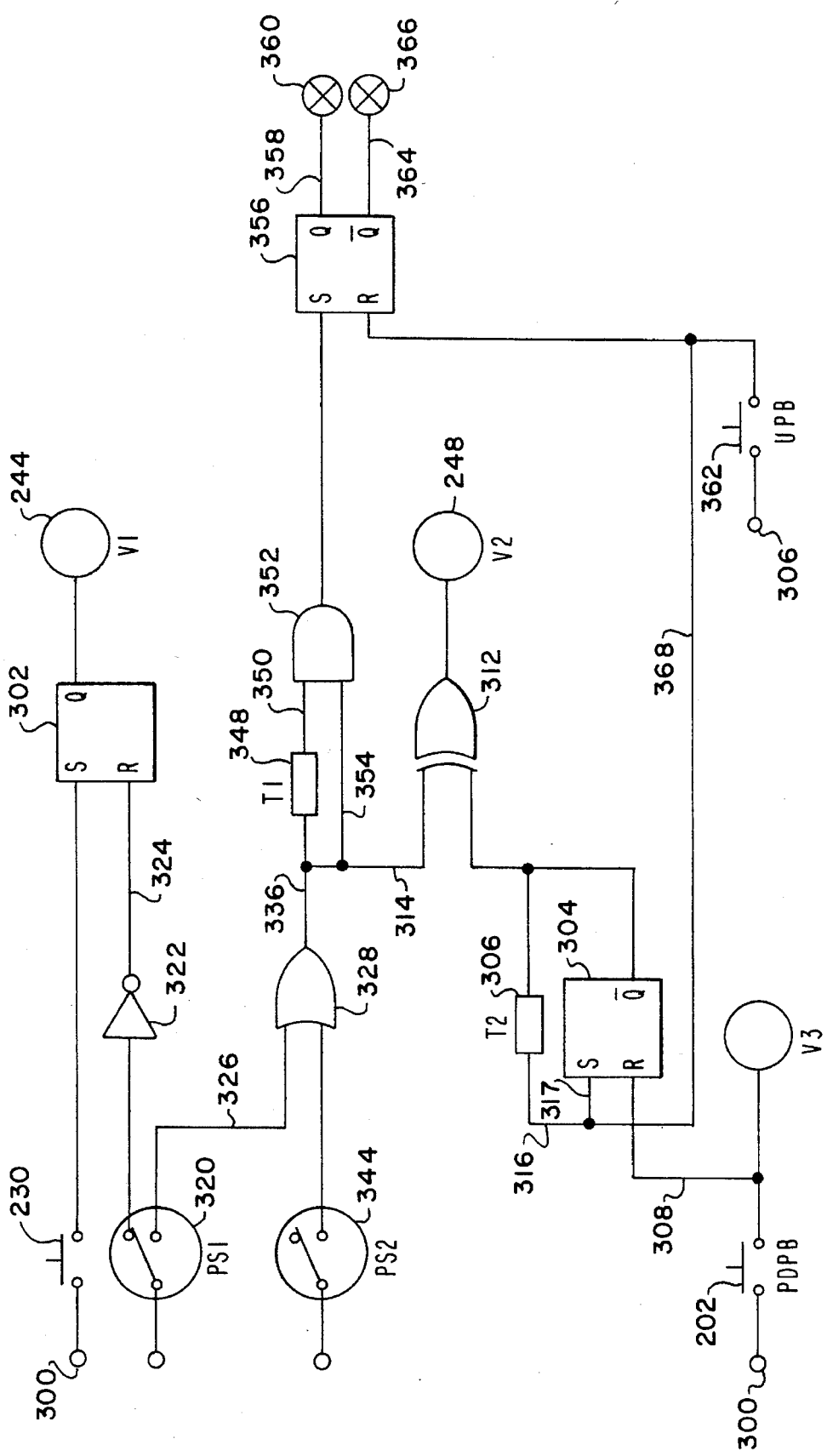
FIG. 10 is a diagrammatic representation showing the logic circuit employed in the product empty monitoring system.

As was described with reference to the operation of the product dispensing switch 202 for actuating solenoid valve 208a, opening valve 208a to permit the flow of high pressure gas to accumulator 214 which effects opening of the dispensing valve and upward movement of piston rod 94. Movement of the piston rod 94 effects closing of microswitch 230 to complete the circuit (FIG. 7). As the product dispensing valve 82 is opened to dispense the soft serve product, the attached valve rod, by means of its beveled surface 228, closes mircoswitch 230 which closes the circuit to energize solenoids 244 and 250. Referring now to FIG. 10, the logic circuit 301 for product monitoring systems 305 is shown. Normally opened microswitch 230, when closed, completes a circuit from a source of low voltage power, e.g., 24 volt DC, connected to terminal 300. Microswitch 230 is thus connected in series between a source of potential and a first flip-flop circuit 302 which, in normal operation, remain ON to conduct power to the manifold valve 244 (V1) also seen in FIG. 9, as part of valve assembly 254. Upon valve 244 being opened, "low pressure" air, under a pressure of about 40 p.s.i., is conducted through conduit 30*a* to the interior of the product container receptacle 22*a* for pressurizing the interior of the receptacle to eject the soft serve product. Additionally, closing of product dispensing switch 202 (FIGS. 7 and 10) causes current to be conducted to a second flip flop 304 and a time delay device 306 (T2). Upon receiving a signal from line 308 at terminal R, the second flip-flop 304 emits a signal $\overline{Q}$ which is conducted through line 310 to one side of an exclusive OR gate 312. Exclusive OR gate 312 is operable to emit a "high" signal to solenoid 248 $V_2$ upon receiving an input from the second flip-flop 304 unless a signal is also received on its other input through lead 314, as occurs during operation of the product monitoring system, to be described. The second flip-flop 304 is suitably purchased as an integral unit having a time delay relay which is operable to prevent the conduction therethrough of current for a desired delay period, suitably 30 minutes, following an ON condition of the second flip-flop 304, whereby a positive output will be fed from the output of the second flip-flop through line 310. Time delay relay 306 thus remains open for a 30-minute period following the actuation of product dispensing switch 202. After the 30 minute period, relay 306 becomes conductive, and a signal is conducted through line 314, time delay relay 306, and line 316, to the S input of the second flip-flop 304, which turns the second flip-flop OFF. Upon flip-flop 304 being turned OFF, the signal is removed from the first terminal of exclusive OR gate 312, turning it OFF and thereby deactivating valve 250, which opens the valve and permits communication with the product container receptacle 22*a* (FIG. 9), relieving pressure within the receptacle 22*a*.

The electro-pneumatic circuit of FIG. 10 also provides a product monitoring system, i.e., a system for testing the amount of soft serve product 32 remaining within the product container 34, as will now be described. When testing for a "product empty" condition, upon the microswitch 230 (FIG. 10) being closed, first flip-flop 302 is energized to operate manifold valve 244, and pressure within the receptacle 22*a* is raised to approximately 35 p.s.i. by the low pressure air. Upon the pressure reaching 35 p.s.i., a "35 p.s.i." pressure responsive switch 320 is closed, whereupon the input to inverting NOR gate 322 is removed, and a potential is applied on line 324 to the R input of first flip-flop circuit 302, turning it OFF, shutting manifold valves 244 and thereby removing the source of low pressure air to the product container receptacle 22*a*. As low pressure switch 320 is closed, a potential is conducted on line 326 to one of the inputs of OR gate 328, and OR gate 328 is operable to emit a signal along lines 336 and 314 to the upper terminal of exclusive OR gate 312, which deenergizes the solenoid 248, opening valve 250 (FIG. 9). Upon valve 250 being opened, air under pressure within the receptacle 22*a* (FIG. 9) is permitted to exhaust through its outlet 28, and successively through valve 250, filter 334, and through an adjustable restrictive flow control orifice 336. Upon air under pressure at 35 p.s.i. being conducted successively through valve 250, conduit 338, filter 340, line 342, and restrictive orifice 336, a second, "30 p.s.i." pressure responsive switch 344 is energized. Referring to FIG. 10, second pressure responsive switch 344 is energized by air which is above its 30 p.s.i. threshold, closing pressure switch 344 and conducting current along line 346 to the other terminal of OR gate 328, which is thereby caused to emit a signal to the upper terminal of exclusive OR gate 312, which then emits a signal to solenoid relay 248 to close valve 250 (FIG. 9). Solenoid 248 is normally open, and upon receiving a signal through exclusive OR gate 312 derived either from the second flip-flop 304 or the OR gate 328, it emits a signal which maintains solenoid 248 in an open condition.

Upon the air under pressure within product receptacle 22*a* being exhausted through the flow control orifice 336 (FIG. 9), the pressure within conduit 242 communicating with pressure sensitive switch 344 falls below 30 p.s.i., and pressure switch 344 is permitted to open again, thereby removing the potential applied through lead 346 to OR gate 328 and removing the signal applied through lead 314 to the exclusive OR gate, thereby turning ON the solenoid 248, since exclusive OR gate 312 will emit a signal when either of its inputs receives a signal. Therefore, valve 250 of solenoid 248 is closed, leaving a 30 p.s.i. pressure within the receptacle 22*a*. A time delay relay 348 is connected through lead 336, to the output terminal of OR gate 328, and through lead 350, with one input terminal of AND gate 352. Time delay 348 is operable in response to signals received from the OR gate 328, which is turned ON if a signal is received from either pressure switch 320 or switch 344 during the test. Thus, 35 p.s.i. switch 320 and time delay relay 348 are turned ON when the test begins, i.e., when the product dispensing switch is closed. Switches 320 and 344 are both turned on shortly after the product dispensing switch is closed. Shortly thereafter, 35 p.s.i. switch 320 is turned OFF as pressure within the line falls below 35 p.s.i. Within a short time period thereafter, e.g., 12 seconds, pressure within line 342 falls below 30 p.s.i. as air under pressure is exhausted through the restrictive orifice, and 30 p.s.i. switch 344 is turned OFF. At this time, OR gate 328 ceases to conduct, and a time delay relay 348 is triggered OFF. Thus, the relay 348, in the present embodiment, is operative to delay its output, i.e., to remain non-conductive for a period of time of approximately 12 seconds, the referenced time being selected as representative of that during which the pressure within the receptacle 22*a* falls from 35 to 30 p.s.i. when the associated product container is substantially empty of soft serve product. Thus, upon receiving an input from the OR gate 328, time delay relay 348 remains non-conductive unless the signal duration is greater than 12 seconds. If that is the case, time delay relay 348 is closed, and a signal is conducted through lead 350 to AND gate 352. AND gate 352, receiving the same signal on its other input terminal through lead 354, is thereby switched to a conductive state, emitting a signal to a third flip-flop unit 356. AND gate 352 thereby switches flip-flop 356 to its "opposite" condition, turning ON output Q connected through lead 358 to red indicator light 360, thereby illuminating the red indicator light. The red indicator light 360 is visible to an operator who may then press the reset switch 362, whereby the third flip-flop 356 is again reset, and a signal is emitted from $\overline{Q}$ through lead 364 to illuminate the green indicator light 366. At this point, the signal supplied through switch 362 is also conducted through lead 368 and lead 317 to the "S" input of the second flip-flop 304, turning flip-flop 304 OFF, whereby the exclusive OR gate 312 is switched off, causing solenoid 348 to open its valve 250 (FIG. 9) whereby the 30 p.s.i. pressure within the receptacle 22*a* is permitted to exhaust through the flow control orifice 336. Air under pressure is thereby exhausted from the receptacle 22*a* within about 30 seconds, whereupon it is safe for the operator to unscrew the head assembly 22a and replace the product container 34. If desired, an additional pressure relief valve 368a (FIG. 9) operated by a further pressure release switch, not shown, can be provided for quickly relieving pressure within the respective product container receptacle. In the preferred embodiment, one of the product empty monitoring systems 305, as discussed above, is provided for each of the product container receptacles 22a, 22b, 22c, 22d, although only the system associated with the first product container receptacle 22a has been described and shown in FIGS. 9 and 10, for simplifying the description and drawing. Upon replacing the product container, it is preferable to maintain the dispensing switch 202 in a closed condition for several seconds until pressure within the unit and within the new, full container of soft serve product builds up and the product is caused to flow forwardly within its container, through the respective heat sink structure and within the front end of the receptacle 22a. The product dispensing switch 202 applies a signal on line 308 to the R input of second flip-flop 304, causing a $\overline{Q}$ output to be applied to the exclusive OR gate 312, closing the valve 248, thereby permitting pressure once again to build up to 35 p.s.i. within the product container receptacle 22a.

Figure 12:
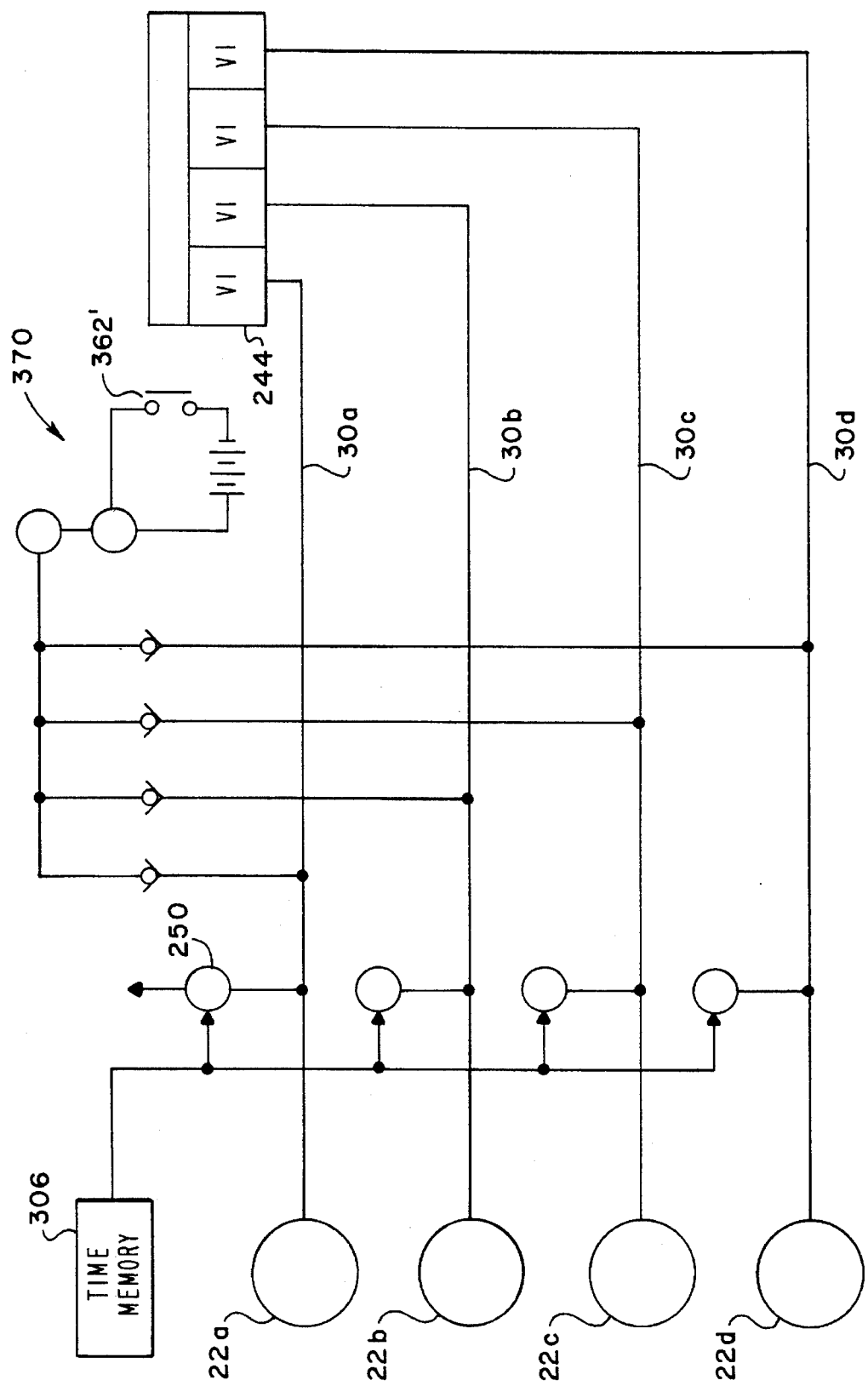
FIG. 12 is a diagrammatic representation of an alternative pressure relief system.

Referring to FIG. 12, an alternative pressure relief system 370 is shown in association with product receptacles 22a, 22b, 22c, 22d and solenoid valves 244 which control the flow of low pressure gas through lines 30a, 30b, 30c, 30d to pressurize the receptacles 22a, 22b, 22c, 22d and solenoid valves 244 which control the flow of low pressure gas through lines 30a, 30b, 30c, 30d to pressurize the receptacles 22a, 22b, 22c, 22d and extrude the soft serve product. In this alternative pressure relief system 370, the product monitoring system 305 described above with reference to FIG. 9 is not used, and the pressure relief system of FIG. 12 is employed instead. Referring to FIG. 7, the pressure relief system 370 (FIG. 12) is actually 30 minutes after pressing of the product relief switch 205 by the customer or operator. Closing of switch 205 actuates the dispensing valve actuator 96a, as previously described, closing microswitch 230, thereby closing the circuit to actuate the time memory delay relay 306 (FIGS. 7 and 12), closing valve 250, thereby retaining pressure within the respective product container receptacle 22a (FIG. 12). After the timed delay, selected e.g., at 30 minutes, the time delay device 306 automatically is deenergized, thereby deenergizing solenoid coil 248, permitting valve 250 to open thereby releasing low pressure air from the receptacle 22. Thus, the system 370 is effective automatically to relieve pressure within the pneumatic system and the receptacles if the apparatus 10 is not used for a period of time, preserving the system and preserving the consistency of the soft serve product contained therein.

Figure 11:
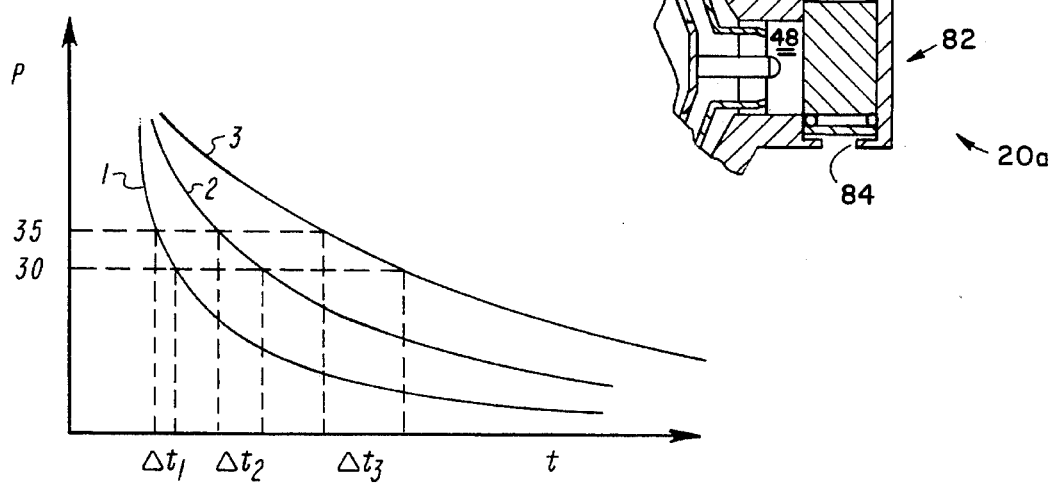
FIG. 11 is a diagram showing the drop in pressure within a product container receptacle over time under several conditions during operation of the product monitoring system.

The principle of the product tube empty indicator system is shown more clearly in FIG. 11 wherein the slopes of curves 1, 2, and 3 represent pressure versus time within the system following opening of valve 250 with respect to a product container which is full (1), half full (2), or empty (3). Thus, a product container which is full of the product, having only a small amount of residual air volume, is quickly exhausted, and the pressure falls sharply as shown by line 1. A product container which is half full has a substantially larger volume of air which takes a longer time to drop, as shown by line 2, and a product container which is empty has a still larger volume of air which is exhausted over a longer period of time as shown by line 3. Thus, $\Delta T_1$, $\Delta T_2$ and $\Delta T_3$ are indicative of the respective times, under each condition, for the pressure to drop from 35 p.s.i. to 30 p.s.i., AT3 being substantially longer than $\Delta T_1$. The delta time is compared in the logic circuit with a standard time, provided by time delay relay 348, of, for example, 12 seconds, and if the tested delta time is greater than 12 seconds, the logic circuit indicates that the tube is empty and should be replaced. Suitably, the product empty warning device 360 is mounted on the exterior of the machine for indicating by red light or some other indication that the tube is empty and should be replaced.

It will now be understood that the present invention provides a new and improved apparatus for refrigerating and dispensing soft serve food products and for providing selective, automatic control of the temperatures within each of a plurality of containers of soft serve products, wherein soft serve products of differing types may be maintained at temperatures appropriate for the respective products within a single food dispensing unit. Accordingly, soft serve confections such as ice creams may be contained in one of the chilled receptacles, and low fat products such as diet yogurt may be kept in another. Moreover, the apparatus is particularly adapted for refrigerating and dispensing soft serve products contained within conveniently removable product containers of the type having a flexible impervious bag for containing the product and in which a heat sink structure is mounted within the container for preventing localized heating of the product, and wherein the cooling sections, comprising evaporative cooling coils, in the preferred embodiment, are positioned adjacent the chilled product container receptacles. In one preferred embodiment, they are positioned in alignment with the heat sink structures. Accordingly, the cooling coils are effective to remove heat from the respective, adjacent heat sink structures, thereby efficiently cooling the soft serve product contained therein upon refrigerant being circulated through and evaporated within the respective cooling coil sections. Further, the apparatus provides an efficient means for raising the temperatures within the respective product container receptacles above a freezing temperature for quickly and conveniently defrosting the receptacles in the event one or more of the food product containers becomes stuck within the respective receptacle because of the formation of ice due to condensation within the receptacle.

Additionally, the soft serve product dispensing apparatus of the present invention provides an effective system for detecting and indicating the existence of an empty or nearly empty container of the soft serve product, the monitoring system being adapted to function efficiently in association with replaceable food product containers in which the product container bag is exhausted by means solely of differential pressures, in which pressure within the product container receptacle external of the flexible bag is increased to effect extrusion of the product. The hydraulically and pneumatically operated dispensing valve is effective to permit convenient and reliable operation of the dispensing mechanism by a customer in a self-service installation, and operation of the valving mechanism is effectively controlled by the damping mechanism for enhancing reliability of the mechanism during extended service. Additionally, the pneumatic valve return system, operated by low pressure gas applied to the upper surface of the actuator piston, is effective to consistently close the product dispensing valve mechanism for preventing waste of the soft serve product during use. The dual pressure air supply system is effective to provide compressed gas under several pressure levels for actuating the various systems of the apparatus, the system requiring only one air compressor and compressor motor.

While only one embodiment of the apparatus, together with modifications thereof, has been described in detail herein and shown in the accompanying drawing, it will be evident that various further modifications are possible in the arrangement and construction of its components without departing from the scope of the invention.

What is claimed is:

1. Apparatus for refrigerating containers of soft serve food products and for dispensing the soft serve products, each product container having an outlet, the apparatus comprising:

a plurality of product container receptacles each adapted to receive a product container inserted therein respectively;

refrigeration means, having respective cooling sections located adjacent each of the receptacles for cooling each of the receptacles and any product container contained therein;

dispensing means, connectable in communication with product containers inserted within the receptacles, respectively, for dispensing a quantity of the product disposed in the product containers, respectively; and the refrigeration means further comprising means for conducting refrigerant to the respective cooling sections and for selectively controlling the temperature within each receptacle controlling refrigerant flow to the respective cooling sections adjacent each receptacle for controlling the temperatures of the food product in the product containers, respectively, appropriate for different food products in the respective product containers.

2. The apparatus of claim 1, wherein the refrigeration means comprises means for compressing and condensing a refrigerant and for selectively conducting the condensed refrigerant to the respective cooling sections.

3. The apparatus of claim 1, wherein the product containers comprise elongated impervious containers having heat sink structures contained therein, respectively, wherein the heat sink structure of each respective product container comprises an elongated structure extending within the respective product container, and wherein the cooling section comprises conduit means for circulating refrigerant adjacent the heat sink structure of a respective product container and for removing heat from the heat sink structure and the food product contained within the product container.

4. The apparatus of claim 3, wherein the cooling sections adjacent the respective receptacles each comprise a conduit which extends peripherally around the receptacle.

5. The apparatus of claim 1, further comprising adjustable thermostatic temperature control means for permitting independent control of the temperature maintained within each respective product container.

6. Apparatus for refrigerating containers of soft serve food products and for dispensing the soft serve products, each product container comprising an elongated, impervious container having an outlet at one end, the apparatus comprising:

a housing;

a plurality of product container receptacles supported within the housing and adapted to receive respective product containers removably inserted therein;

refrigeration means for cooling the product container receptacles and any product containers inserted therein;

dispensing means, connectable with the outlets of the product containers, for dispensing a quantity of the food product contained within a selected one of the product containers, respectively, the dispensing means comprising a plurality of dispensing units operatively associated with the respective product container receptacles, each unit having a dispensing valve connectable with the outlet of a respective product container, and an actuator system operatively connected to the dispensing valve of each respective dispensing unit and comprising a piston operably connected to the dispensing valve and disposed in a chamber formed in an actuator housing, and means for causing pressure fluid to flow to said chamber to effect gradual opening of said dispensing valve to provide a gradually accelerating flow of food product from a respective product container.

7. Apparatus for refrigerating a plurality of product containers of soft serve food product and for dispensing quantities of soft serve food product from a selected one of the product containers, the apparatus comprising:

a housing;

a plurality of product container receptacles mounted within the housing for receiving respective product containers;

a refrigeration system having a compressor, a condenser, and a plurality of evaporator sections mounted within the housing adjacent respective ones of the product container receptacles;

a plurality of refrigerant supply means, connected between the condenser and respective ones of the evaporator sections, for conducting condensed refrigerant to the respective evaporator sections;

means for selectively controlling the refrigerant flow to the respective evaporator sections for controlling the temperatures of the food products in the respective product containers appropriate for different food products in the respective product containers; and product dispensing units removably mountable in communication with respective containers of soft serve product.

8. The apparatus of claim 7, wherein the evaporator sections comprise respective conduits positioned adjacent the respective product container receptacles.

9. The apparatus of claim 8, wherein the product container receptacles comprise elongated barrels for receiving the respective product containers and wherein the evaporator sections comprise respective cooling coils extending around the periphery of the respective product container barrels.

10. The apparatus of claim 9, wherein the product containers are of a type having an open end having a heat sink structure provided therein and a closed end spaced from the heat sink structure, and wherein the evaporator sections are positioned adjacent and in alignment with the heat sink structures of respective product containers, upon the product containers being seated within the respective product container receptacles.

11. The apparatus of claim 10, further comprising a defrosting system comprising means, connected with the outlet of the compressor and communicating with the evaporator sections, for conducting compressed, heated refrigerant in gaseous form through the evaporator sections, respectively.

12. The apparatus of claim 7, further comprising means for supplying gas under a first pressure to the respective product containers for effecting extrusion of the soft serve product.

13. Apparatus for refrigerating product containers of soft serve food products and for selectively dispensing quantities of the soft serve products, the product containers each comprising an elongated, impervious, flexible bag having an outlet at one end, the apparatus comprising:

a housing;

a plurality of chilled receptacle means for receiving respective product containers, each receptacle means having an outlet connectable in communication with the open end portion of a respective flexible product container contained therein and having a barrel section adapted for receiving the product container;

refrigeration means for cooling the barrels of the receptacle means and any product containers therein;

dispensing means for dispensing a selected product contained within a container inserted in one of the product container receptacles by compressing its flexible bag to cause the food product to flow outwardly through the outlet;

a monitoring system, comprising means for detecting the exhaustion of substantially all of the food product contained within the respective product containers by monitoring the volume of a fluid exhausted from a space within the product receptacle means and external of the flexible bags, respectively.

14. Apparatus for refrigerating containers of soft serve food products and for dispensing the soft serve food products, each container comprising an elongated, impervious product container having an outlet at one end, the apparatus comprising:

a housing;

a plurality of product container receptacles supported within the housing and adapted to receive respective product containers removably inserted therein;

refrigeration means for cooling the product container receptacles and any product containers inserted therein;

dispensing means, connectable with the outlets of the product containers, for dispensing a quantity of the food product contained within a selected one of the product containers, the dispensing means comprising a plurality of dispensing units operatively associated with the respective product container receptacles, each dispensing unit having a dispensing valve connectable with the outlet of a respective product container;

an actuator system operatively connected to the dispensing valve of each respective dispensing unit and comprising an actuator having a piston member operatively connected to the respective dispensing valve, first and second piston chamber sections being defined on opposite sides of the piston member, the actuator system further comprising an accumulator containing a liquid medium and having communication with the first chamber section, and further comprising means for applying a gas under a first pressure within the accumulator for causing the liquid medium to flow from the accumulator to the first chamber section for translating the piston member toward the second chamber section and for opening the dispensing valve; and means for shutting off the flow of gas to the accumulator and for applying a gas under a second, lower pressure to the second chamber section for opposing movement of the piston member toward the second chamber section, and, upon pressure within the first chamber section being reduced, for translating the piston member toward the first chamber section and closing the dispensing valve.

15. Apparatus for refrigerating containers of soft serve food products and for dispensing the soft serve food products, each container comprising an elongated, impervious product container having an outlet at one end, the apparatus comprising:

a housing;

a plurality of product container receptacles supported within the housing and adapted to receive respective product containers removably inserted therein;

refrigeration means for cooling the product container receptacles and any product containers inserted therein;

dispensing means, connectable with the outlets of the product containers, for dispensing a quantity of the food product contained within a selected one of the product containers, the dispensing means comprising a plurality of dispensing units operatively associated with the respective product container receptacles, each dispensing unit having a dispensing valve connectable with the outlet of a respective product container, further comprising an actuator system operatively connected to the dispensing valve of each respective dispensing unit; and means for supplying gas to the respective dispensing units under a first pressure and under a second pressure, comprising a single air compressor, a first reservoir adapted to receive gas under said first pressure, a second reservoir adapted to receive gas under a second pressure lower than said first pressure, and regulating and valving means connected between the compressor and the first and second reservoirs for supplying gas under said first pressure to the respective dispensing units and for supplying gas from the second reservoir under a third pressure, lower than said first and second pressures, to the dispensing units.

16. Apparatus for refrigerating a plurality of product containers of soft serve food product and for dispensing quantities of soft serve food product from a selected one of the product containers, the apparatus comprising:

a housing;

a plurality of product container receptacles mounted within the housing for receiving respective product containers;

product dispensing units removably mountable in communication with the respective product containers;

a refrigeration system having a compressor, a condenser, and a plurality of evaporator sections mounted within the housing adjacent respective ones of the product container receptacles;

a plurality of refrigerant supply means, connected between the condenser and respective ones of the evaporator sections, for conducting condensed refrigerant to the respective evaporator sections;

means for selectively controlling the refrigerant flow to the respective evaporator sections; and a defrosting system comprising means, connected with the outlet of the compressor and communicating with the evaporator sections, for conducting compressed, heated refrigerant in gaseous form through the evaporator sections, said defrosting system comprising means for increasing the temperature of the product container receptacles for thawing ice deposits which may have formed between the product container receptacles and any product containers therein, respectively.

17. Apparatus for refrigerating a plurality of product containers of soft serve food product and for dispensing quantities of soft serve food product from a selected one of the product containers, the apparatus comprising:

a housing, a plurality of product container receptacles mounted within the housing for receiving respective product containers;

product dispensing units removably mountable in communication with respective product containers of soft serve food product;

a refrigeration system having a compressor, a condenser, and a plurality of evaporator sections mounted within the housing adjacent respective ones of the product container receptacles;

a plurality of refrigerant supply means, connected between the condenser and respective ones of the evaporator sections, for conducting condensed refrigerant to the respective evaporator sections;

means for selectively controlling the refrigerant flow to the respective evaporator sections; and a defrosting system comprising means, connected with the outlet of the compressor and communicating with the evaporator sections, for conducting compressed, heated refrigerant in gaseous form through the evaporator sections, said defrosting system including a manifold and conduits connected to the manifold for supplying refrigerant to the respective evaporator sections and valving means for permitting flow of refrigerant to the evaporator sections from the compressor and preventing any reverse flow of refrigerant to the manifold.

18. Apparatus for refrigerating product containers of soft serve food products and for selectively dispensing quantities of the soft serve food products, the product containers each comprising an elongated, impervious, flexible bag having an outlet at one end, the apparatus comprising:

a housing;

a plurality of chilled receptacle means for receiving respective product containers, each receptacle means having an outlet connectable in communication with an open end portion of a respective product container contained therein and having a barrel section adapted for receiving the product container;

refrigeration means for cooling the barrel sections of the receptacles means, respectively, and any food product therein;

dispensing means for dispensing a selected product contained within a product container inserted in one of the receptacle means by compressing its flexible bag to cause the food product to flow outwardly through the outlet; and a monitoring system, comprising means for detecting the exhaustion of substantially all of the food product contained within the respective product containers, the monitoring system including means operable for monitoring the volume within the receptacle means and external of the flexible bags, respectively, the monitoring system further comprising means for introducing a gas within each receptacle means and within a respective product container inserted therein, external of the flexible bag of the respective product container, and for determining the volume of the residual space within the product container relative to a predetermined volume corresponding to a product empty condition, by comparing the volume of gas within the residual space with that associated with a product empty condition.

19. The apparatus of claim 18, wherein the gas introduced within the residual space within a respective one of the receptacle means is exhausted through a restrictive orifice and wherein the time required for the gas to fall from a first pressure to a second pressure is compared with a predetermined value corresponding to a condition in which the food product within the respective product container has been substantially exhausted.

* * * * *